United States Patent [19]

Maxfield et al.

[11] 4,187,399
[45] Feb. 5, 1980

[54] CALL STATE PROCESSOR FOR A TIME DIVISION SWITCHING SYSTEM

[75] Inventors: Thomas G. Maxfield, Boulder; Ronald K. Witmore, Lafayette, both of Colo.

[73] Assignee: Bell Telephone Laboratories, Incorporated, Murray Hill, N.J.

[21] Appl. No.: 912,833

[22] Filed: Jun. 5, 1978

[51] Int. Cl.² .................................................. H04Q 11/04
[52] U.S. Cl. .............................. 179/15 BY; 179/15 BA
[58] Field of Search ......... 179/18 FG, 18 FF, 18 ES, 179/15 BY, 15 AT, 15 BA

[56] References Cited

U.S. PATENT DOCUMENTS

| | | | |
|---|---|---|---|
| 3,271,521 | 9/1966 | Von Sanden et al. | 179/15 BY |
| 3,420,960 | 1/1969 | Jacoby et al. | 179/18 FG |
| 3,787,631 | 1/1974 | Lewis | 179/15 AT |
| 3,789,125 | 1/1974 | Medill et al. | 179/99 |
| 3,789,154 | 1/1974 | Medill | 179/99 |
| 3,800,094 | 3/1974 | Schwarzer | 179/18 FG |
| 3,885,103 | 5/1975 | Smith et al. | 179/15 AT |
| 3,908,092 | 9/1975 | Hight et al. | 179/18 ES |
| 3,967,072 | 6/1976 | Dimmick et al. | 179/18 ES X |
| 4,061,880 | 12/1977 | Collins et al. | 179/15 BA |

*Primary Examiner*—Thomas W. Brown
*Attorney, Agent, or Firm*—Donald M. Duft

[57] ABSTRACT

A semiautonomous digit collection and call state detection subsystem is provided for use in a time division switching system such as a PBX. Each active (call serving) system port circuit applies a hook state signal to a specially provided bus during each occurrence of the time slot to which the port circuit is assigned. The subsystem's logic analyzes these hook state signals to identify certain predetermined call states and to count dial pulses. Output messages representing identified call states and dialed digits are made available to the switching system under control of a system scanner.

23 Claims, 15 Drawing Figures

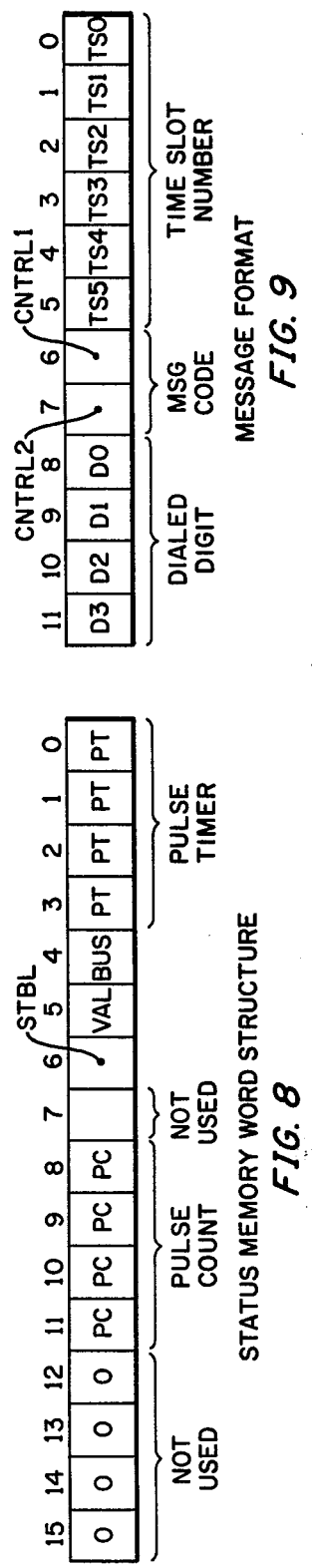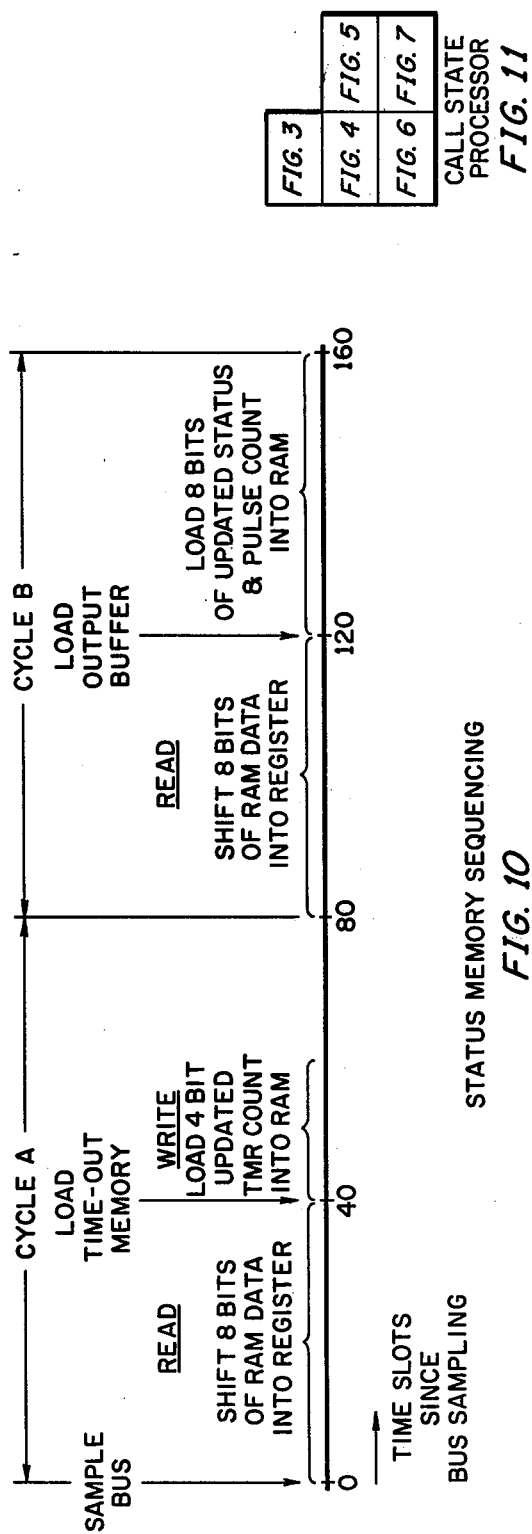

FIG. 14
STATE TRANSITIONS

| | ROM 610 & 611 INPUTS — PRESENT STATE | | | | | ROM 610 & 611 OUTPUTS — NEXT STATE | | | | | | | |
|---|---|---|---|---|---|---|---|---|---|---|---|---|---|
| STATE | VAL_NEXT 1=MK 0=BK | VAL_LAST 1=MK 0=BK | STBL_LAST 1=STB | PULSE COUNT PCO 0=NO PULSES | TIMER TO 0=TIME-OUT | STBL_NEXT 1=STB | INCR PT CYCLE A 1=INCR | INCR PC CYCLE B 1=INCR | TINIT 1=INIT | TPCLR 1=CLR | LOAD 1=LOAD | CNTRL2 | CNTRL1 |
| 1-STABMK | 1 | 1 | 1 | X | X | 1 | 1 | X | X | X | 0 | X | X |
| 2-STATCHGO | 0 | 1 | 1 | X | X | 0 | 0 | X | 1 | 1 | 1 | 0 | 1 |
| 3-COUNTBK | 0 | 0 | 0 | X | 1 | 0 | 1 | 0 | 0 | 0 | 0 | X | X |
| 4-DIALABDN | 0 | 0 | 0 | X | 0 | 1 | 1 | X | X | X | 1 | 1 | 0 |
| 5-STABBK | 0 | 0 | 1 | X | X | 0 | 1 | 1 | 1 | 0 | 0 | X | X |
| 6-STARTMK | 1 | 0 | 0 | X | X | 0 | 0 | X | 1 | 1 | 0 | X | X |
| 7-STATCHG1 | 1 | 1 | 1 | X | 1 | 1 | 1 | 0 | 0 | 0 | 1 | 1 | 1 |
| 8-COUNTMK | 1 | 1 | 0 | 1 | 0 | 0 | 1 | X | X | X | 0 | X | X |
| 9-DIGDONE | 1 | 1 | 0 | 0 | 0 | 1 | 1 | X | X | X | 0 | 0 | 0 |
| 10-NODIGMK | 1 | 1 | 0 | X | X | 1 | 1 | 0 | X | X | 0 | X | X |
| 11-STARTBK | 0 | 1 | 0 | X | X | 0 | 0 | 0 | 1 | 0 | 0 | X | X |

CALL STATE PROCESSOR FOR A TIME DIVISION SWITCHING SYSTEM

BACKGROUND OF THE INVENTION

1. Field of the Invention

This invention relates to a program controlled telephone switching system and, in particular, to a switching system of the time division type. More particularly, the invention relates to facilities for reducing the real time requirements of the system processor or controller.

2. Description of the Prior Art

It is known in prior art program controlled switching systems to use a single processor comprising a control unit and associated bulk memory to perform the system work functions. The work of the processor in such systems may generally be divided into several different functions. The first is the scanning of line and trunk circuits or ports to detect hook state signals originating in or received by those circuits. The processor uses these signals to derive call status information as well as to identify dialed digits. The second function performed by the processor is the call processing work that must be executed to control the establishment and release of call connections. A third function relates to the maintenance and administrative programs that must be executed periodically to assure the reliable system operation.

The use of a single processor is satisfactory so long as the processor throughput is sufficient to accommodate all of the tasks it is required to perform. However, as the system increases in size or call activity, the demands on the processor may equal or exceed the processor's capability. Arrangements must then be made either to increase the processor capacity or to reduce its real time requirements.

It is known in the prior art to provide auxiliary facilities which reduce the real time requirements on the processor by performing some of the more routine and time consuming system chores. Examples of such chores are line scanning and the analysis of scanning information to detect certain call states such as switchhook flash, call abandon, dial pulses, etc. The following three U.S. Pat. Nos. disclose prior art arrangements of this type:

3,408,628; Brass et al; Oct. 29, 1968; 3,627,954; Quinn; Dec. 14, 1971; 3,629,851; Ulrich; Dec. 21, 1971.

Brass discloses a stored program controlled switching system having an auxiliary processor (termed a signal processor) which performs some of the more repetitive and time consuming system tasks such as the scanning of line and trunk circuits. The signal processor interacts with the main processor by means of shared memory common to both elements.

Quinn discloses a stored program controlled switching system having an auxiliary processor for performing repetitive and time consuming system tasks such as detecting the current state of lines and trunks, controlling the registration of dialed digits, and controlling the outpulsing of digits to distant offices.

Ulrich discloses a stored program controlled switching system having a main processor and an auxiliary processor. The auxiliary processor performs repetitive chores such as scanning lines and trunks to detect call state signals that may represent service requests. Upon the detection of such a signal, the auxiliary processor notifies the main processor via a shared memory that a specified task must now be performed for the requesting line or trunk.

The auxiliary processor facilities disclosed in the above cited prior art are satisfactory in that the provison of an auxiliary processor in any system obviously reduces the work load on the main processor and thereby increases the system's call serving capability. However, these auxiliary processor facilities are complex and costly, they involve a significant modification to the original system and, to a degree, merely amount to the use of a second system processor. Therefore, even though these arrangements are satisfactory for the systems for which they were designed, the cost penalty associated with them precludes their use in systems in which cost considerations are paramount.

SUMMARY OF THE INVENTION

Object of the Invention

It is an object of this invention to reduce the real time demands on the main processor of a communication switching system.

It is another object to provide auxiliary facilities for performing the more repetitive and time consuming system tasks of a system processor.

It is a further object to provide auxiliary processing facilities that do not unduly increase system cost and complexity.

Summary Description

In accordance with our invention, we provide a semi-autonomous subsystem having a call state processor that performs digit collection and active line scanning functions in a software controlled time division switching system. These functions include the scanning of line port circuits currently serving a call, the scanning of trunk port circuits during call states in which dial pulses may be received by the trunk port circuits, the analysis of the information derived from the port circuit scanning to detect predetermined call states and state changes such as a switchhook flash, the reception of dial pulses, call terminations, etc. The provision of these facilities reduces the real time requirements of the system processor and thereby permits an increase in system line size for the same processor throughput.

The subsystem comprises a specially provided additional time division bus together with circuitry for sampling signals applied to the bus representing the current hook state of active (call serving) line port circuits as well as active trunk port circuits, (those in a dial pulse receiving call state). Our subsystem further comprises facilities, including the call state processor for sampling every 10 milliseconds each time slot associated with an active port circuit and for momentarily storing a signal representing the state of each such sampled time slot for approximately 161 microseconds. During this 161-microsecond interval, logic circuitry (1) compares the current hook state of the sampled time slot with stored information representing the hook state of the slot on prior samples and (2) from this comparison determines whether the current status of the call is to be left unchanged or updated to a new status. This process continues until the logic circuitry determines that the stored call information for a particular time slot represents call information that should be transmitted to the main switching system. At that time, our subsystem generates a coded output message identifying the nature of the state information to be transmitted, such as a call abandonment, a switchhook flash, the identity of a dialed digit, etc. The output portion of our subsystem is scanned routinely by the main system processor and each message that is transmitted on a scan operation contains the the call state information as well as the identity of the time slot serving the call. The system processor receives this information and adds it to that it already has for the same call.

The provision of the disclosed subsystem reduces the real time requirements of the processor and thereby allows a processor of a given capacity to control a system of a larger line size than would be possible if the digit collection and call state detection function was done in software by the main system processor.

Features

A feature of the invention is the provision in a time division switching system of a specially provided additional bus that is connected to the system port circuits for receiving signals indicating the current call status of each active port circuit.

A further feature is the provision of facilities, including a call state processor for periodically sampling time slot signals representing the hook state of each active port circuit, for temporarily registering the current state of each sampled time slot, for comparing the latest hook state information with call status information pertaining to the same time slot stored in a status memory, and for determining from said comparison whether the call status is to be updated or left unchanged.

A further feature is the provision of facilities for detecting call state or status changes representing dial pulses and for recording the dialed digits in a temporary memory.

A further feature is the provision of facilities for detecting the occurrence of predetermined call states and for generating output messages containing information pertaining to predetermined ones of the detected call states.

A further feature is that these facilities generate an output message upon the detection of each such predetermined call state or status with each message containing information specifying the time slot serving the call, identifying the call state repesented by the message, and specifying the identity of a dialed digit in the event that the call state specifies the completion of a pulse series representing a dialed digit.

DESCRIPTION OF THE DRAWING

These and other objects, advantages, and features of the invention will be more readily understood upon a reading of the following description of an exemplary embodiment of the invention taken in conjunction with the drawing in which

FIG. 8 discloses the word format of a memory element which is used to store call status information in our subsystem;

FIG. 9 discloses the word bit format of the output messages generated by our subsystem;

FIGS. 10 and 12 are timing diagrams illustrating the time relationships between the various subsystem functions;

FIG. 14 illustrates the status memory input and output signals for the various call states.

GENERAL DESCRIPTION

Figure 1:
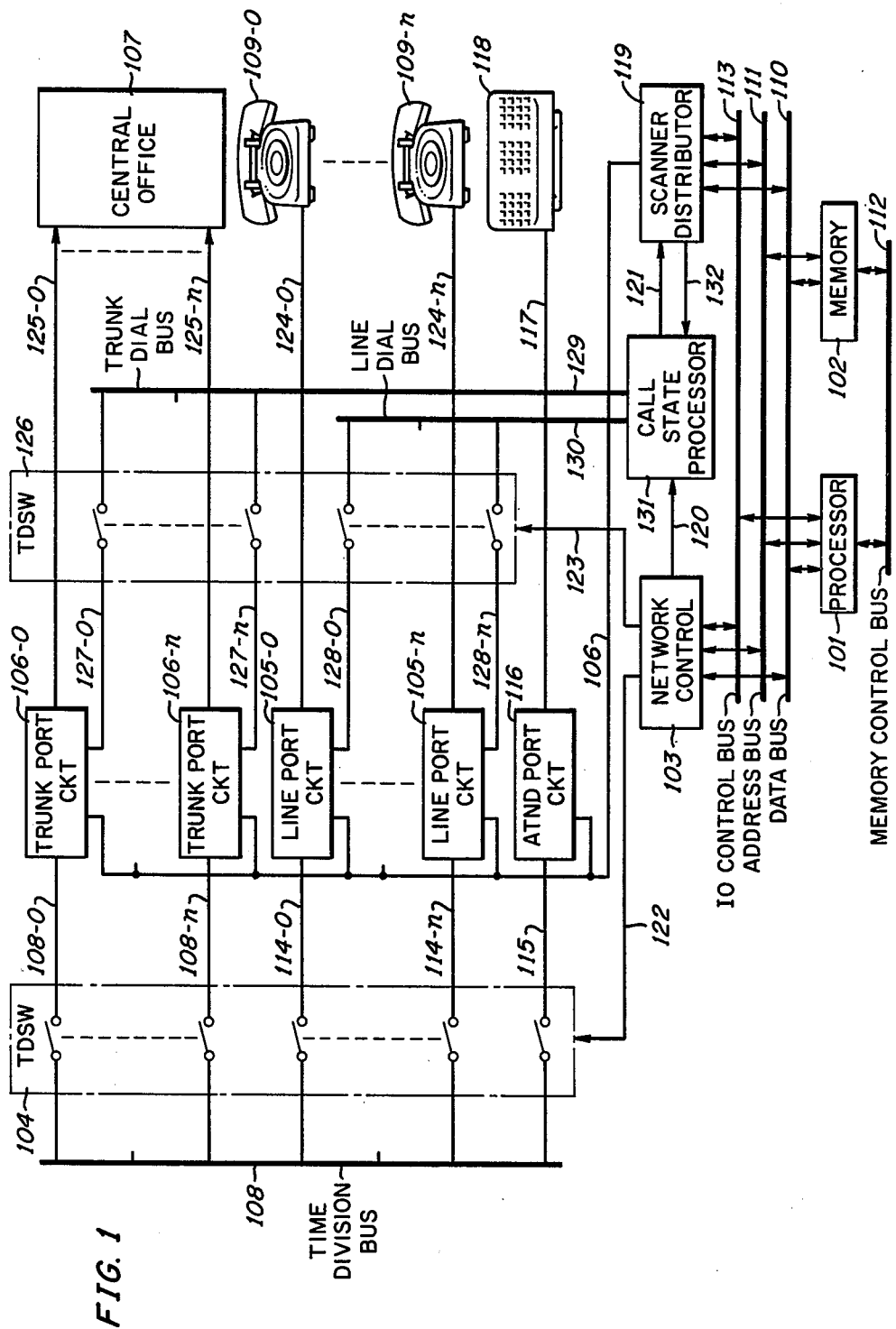
FIG. 1 is a block diagram of a time division switching system embodying the invention.

A typical telephone switching system embodying our invention is shown diagrammatically on FIG. 1. The system comprises a processor 101, memory 102, line port circuits 105, and trunk port circuits 106. The line port circuits are connected over paths 124 to telephones 109; the trunk port circuits are connected to central office 107 over paths 125. Port circuits 105 and 106 are also connected over path 106 to a scanner distributor 119. The system further includes a data bus 110, an address bus 111, a memory control bus 112, and an I/O control bus 113. The address bus and the data bus are connected in common to the memory 102, processor 101, network control 103, and scanner distributor 119. Memory control bus 112 connects only the processor and the memory. The I/O control bus 113 connects only the processor 101, network control, and the scanner distributor.

The system of FIG. 1 further includes a first set of time division switches 104 which interconnect the port circuits with the time division bus 108. This bus and the time division switches 104 provide the communication path over which the port circuits and their associated telephones 109 or trunks 125 communicate with one another during the serving of calls. The system of FIG. 1 further includes a second set of time division switches 126 which controllably interconnect the trunk port circuits with a trunk dial bus 129 and which controllably interconnect the line port circuits with a line dial bus 130. Buses 129 and 130 are connected to call state processor 131 which, as subsequently described, monitors time slot hook state signals applied to buses 129 and 130 from active port circuits and provides appropriate output messages over path 121 to scanner distributor 119 to advise the rest of the system of significant changes in call status for each call served by the port circuits. This is done in response to signals applied to path 132 by scanner distributor 119.

The system of FIG. 1 further includes an attendant port circuit 116 which is connected over path 115 to the time division switches 104 and which is also connected over path 117 to an attendant's console 118. These attendant's facilities are normally included as part of a commercially provided PBX. However, these facilities comprise no portion of the present invention.

Processor 101 operates under control of program commands and data that is either temporarily or permanently stored in memory 102. The processor, with the assistance of the memory, controls the time division switches 104. It does this by monitoring the state of each line and trunk port circuit and by selectively altering the state of various hardware elements in network control 103, scanner distributor 119, and the port circuits. Commands are transmitted to the scanner distributor and network control from the processor 101 over data bus 110. Scan responses and other state information are transmitted back to the processor from network control and the scanner distributor over data bus 110. Network control and the scanner distributor are selectively primed to respond to selected commands by signals applied to address bus 111.

In a typical time division manner, two of the switches 104 associated with either two line port circuits or a line port circuit and a trunk port circuit are interconnected on a call by determining the availability of an idle time slot upon the detection of a service request by one of the port circuits, by assigning the two port circuits that are to be connected to the idle time slot and by then closing the time division switches 104 for the two selected port circuits during each occurrence of the assigned time slot. In a typical prior art manner, a port circuit is assigned to a specific time slot by writing a binary 1 in a port circuit shift register individual to the port circuit with the shift register having a bit position unique to each time slot. This causes its time division switch 104 to close during each occurrence of the assigned time slot so that the port circuit is connected to the time division bus 108 during each occurrence of the time slot to which it is assigned. In a similar manner, a port circuit is removed from a call by erasing the binary 1 in the port circuit's shift register. This deactivates its time division switch 104 so that it no longer closes during subsequent occurrences of the time slot to which its port circuit was assigned.

The processor can selectively address memory locations by transmitting address information over bus 111 to the memory. The contents of the addressed memory location are returned to the processor over data bus 110. The processor communicates with network control and with the scanner distributor in a similar manner with the address commands being transmitted over bus 111 and with the I/O control bus 113 being used to specify the particular circuit that is to respond to the address command. The system responses are returned to the processor over bus 110. The control buses 112 and 113 comprise a plurality of separate conductors with each conductor being used for a distinct circuit function such as, for example, a memory write, memory read, and memory complete indication.

The call state processor 131 of our invention receives signals from buses 129 and 130 indicating the current hook status of each call serving line port cicuit and each trunk port circuit in a dial pulse receiving state. Each such active port circuit is assigned to a unique time slot and during each occurrence of the assigned time slot the call state processor receives a hook state signal from the port circit assigned to the time slot. The call state processor also receives timing and control signals from network control 103 over path 120. In response to the control signals, processor 131 periodically samples the hook state signal from each active port circuit, records the state of each active port circuit on successive samples, and compares the current port circuit state with information temporarily stored and pertaining to the same port circuit from prior samples. From this, logic circuitry within the processor permits it to detect significant changes in call state such as call abandonment, switchhook flashes, etc. The logic circuitry within the processor also permits it to detect the occurrences of dial pulses, to count and temporarily store the pulses in a pulse train, and upon the termination of a pulse train, to identify the dialed digit. The processor provides output information to the rest of the system over path 121 via the scanner distributor to indicate significant changes in call status as well as the identification of any dialed digit. The output messages generated by processor 131 identify the associated time slot so that the message information may be correlated by the processor 101 with information already in the memory 102 pertaining to the same call.

Figure 2:
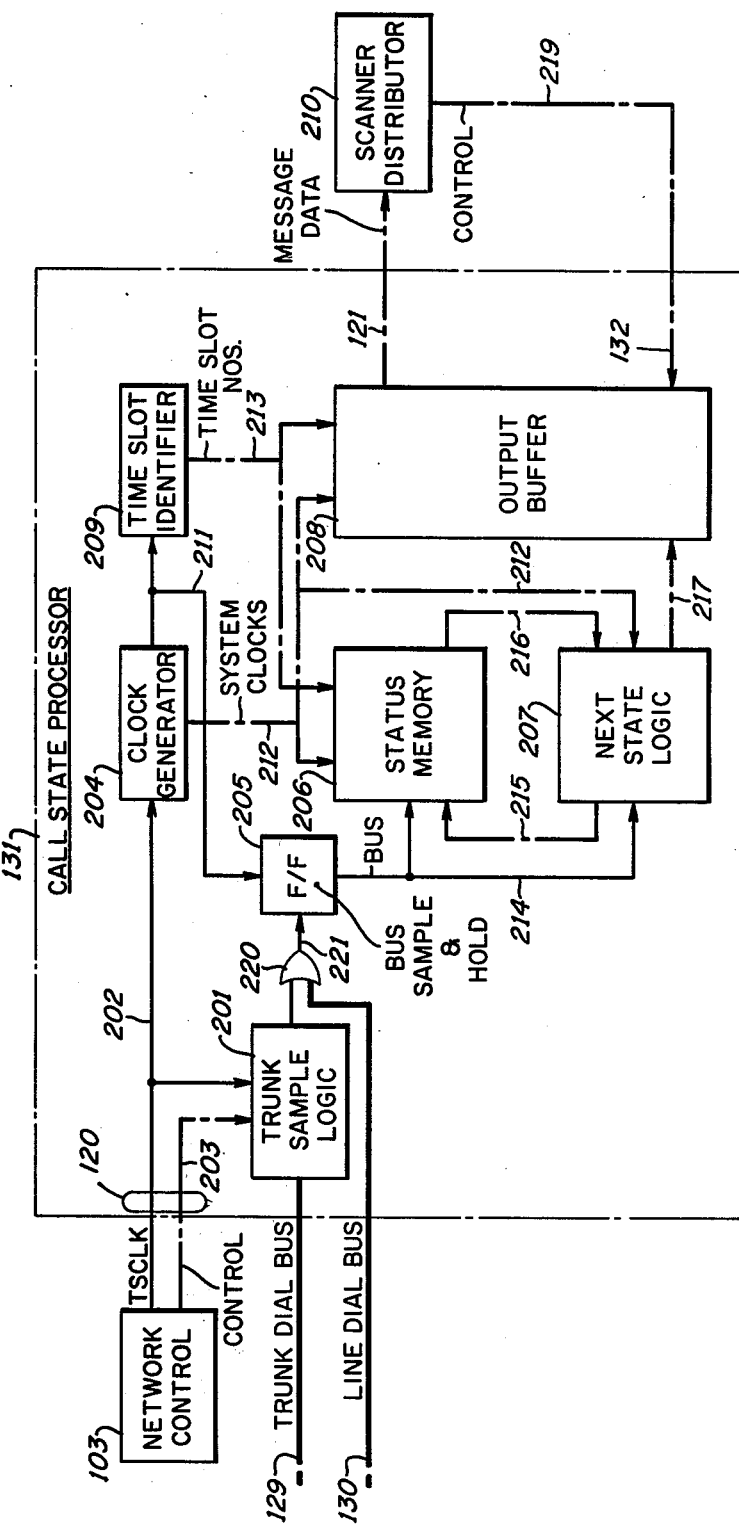
FIG. 2 is a block diagram of our subsystem.

FIG. 2 illustrates further details of the call state processor 131 of FIG. 1. As shown on FIG. 2, the processor includes clock generator 204, time slot identifier 209, trunk sample logic 201, sample and hold flip-flop 205, status memory 206, next state logic 207, and output buffer 208. The circuit of FIG. 2 analyzes the hook state signals appearing on trunk dial bus 129 and line dial bus 130 to derive call status information. The circuit operates under control of timing, control, and time slot signals applied to it over paths 202 and 203 by network control 103. Output messages containing the call status information are transmitted from output buffer 208 over path 121 to the scanner distributor 210. The output buffer is controlled in this operation by the signals applied to it over path 219 from the scanner distributor.

Network control 103 applies a pulse to lead TSCLK (time slot clock) 202 during each occurrence of each time slot. Let it be assumed that the system of FIG. 1 operates in a mode having 64 time slots in each of a series of cyclically recurring time slots. The time slot pulses are thus applied to lead 202 at a 1 per microsecond (approximately) rate. Lead 202 extends to clock generator 204 which includes a divide by 161 counter having output conductor 211. Thus, an output pulse appears on conductor 211 once for each 161 input pulses on lead 202. A pulse on path 211 is hereinafter referred to as the sample pulse since this pulse activates the circuitry that samples, analyzes, and processes the hook state information appearing on buses 129 and 130. The sample pulse is applied as an input to the sample and hold flip-flop 205 as well as to time slot identifier 209.

The hook state signals appearing on line dial bus 130 are applied through OR gate 220 to input 221 of the sample and hold flip-flop 205. The signals on trunk dial bus 129 are applied to the trunk sample logic circuit 201. The function of this circuit is to interconnect bus 129 with OR gate 220 only during the occurrence of each time slot assigned to a call currently being served by a trunk port circuit in a dial pulse receiving call state. Buses 129 and 130 are served by the same cyclically recurring series of time slots and thus it is not possible for the same time slot to be serving one call via a line port circuit on bus 130 and another call via a trunk port circuit on bus 129. The trunk sample logic 201 interconnects the trunk dial bus 129 with gate 220 during the occurrence of a particular time slot under control of network control 103. More specifically, the trunk sample logic circuit 201 is activated during a time slot occurrence by path 203 to interconnect bus 129 with gate 220 only when a trunk port circuit assigned to the time slot is in a call state in which it is expected that the trunk port circuit will receive dial pulses incoming to the PBX such as, for example, on a DID call or on an incoming tie trunk call. At that time, network control determines the time slot to which the incoming trunk call is assigned, and then activates circuit 201 to cause bus 129 to be connected to gate 220 during each occurrence of the time slot. As is subsequently described, after the dial pulses are received and the digits representing the pulses are transmitted to the rest of the system by circuit 131, network control 103 deactivates circuit 201 so that bus 129 will no longer be connected signalwise to OR gate 220 during each subsequent occurrence of this time slot.

The characteristics of the system in which the present invention is embodied are such that the trunk port circuits could, at times, possibly cause spurious signals to be applied to the dial bus. For this reason, bus 129 is effectively disconnected signalwise from gate 220, with respect to a particular time slot, other than during times in which the trunk port circuit assigned to the call and served by the time slot may receive dial pulses. Line dial bus 130 does not receive such spurious signals and therefore it is satisfactory to connect bus 130 permanently to the input of OR gate 220.

OR gate 220 combines the signals on buses 129 and 130 and applies them to input 221 of flip-flop 205. Flip-flop 205 does not respond to every signal it receives. Rather, the flip-flop responds and is set to the state represented by an incoming signal only when an enable signal is coincidentally received by it on conductor 211.

It has already been mentioned that clock generator 204 includes a divide by 161 counter which receives the time slot clock pulses on lead 202 and applies one output pulse to path 211 for every 161 received input pulses. Each such output pulse is applied to flip-flop 205 as a sample signal to set the flip-flop to the state of the hook state signal then currently applied to its input 221. The flip-flop remains in the state to which it is set until the reception of the next sample pulse on conductor 211.

The time slot pulses are generated and applied to path 202 at approximately a one microsecond rate. Therefore, a sample pulse is applied to conductor 211 approximately once every 161 microseconds and flip-flop 205 remains in the state to which it is set by a coincidentally received hook state signal for approximately 161 microseconds. The remainder of the disclosed circuitry (1) analyzes the information represented by the state to which the flip-flop is set, (2) compares this information with that it has already received and stored pertaining to the same call on prior samples, and (3) updates the current status of the call if required. This updated information may or may not require output messages to be transmitted to the rest of the system.

Each sample pulse on path 211 is also applied to time slot identifier 209 which generates output information identifying the number of the time slot currently being sampled by flip-flop 205. The output of time slot identifier 209 is applied as address information to status memory 206 and output buffer 208.

When hook state information for a sampled time slot is stored in flip-flop 205, an output signal representing the sampled hook status is applied to next state logic element 207 and status memory 206 over path 214. Concurrently, status memory 206 applies information to element 207 over path 216 specifying the status of the call for the same time slot on prior samples. Element 207 compares the current state of the sampled time slot with the information received from memory 206 and, from this, it derives updated call status information. The updated information is then transmitted over path 215 and entered into memory 206. This updated information may be different from or may be identical to that representing the status of the time slot on the prior sample. The determination of whether the updated status is different from the prior status depends upon a number of factors, including the time that has elapsed since the last switchhook change of state.

Ultimately, after a number of successive samples by flip-flop 205, the status for a call advances and requires a message to be sent to the rest of the system. The determination of when a message is to be sent is made by the next state logic 207. At such times, it transmits information over path 217 to output buffer 208 to form the message that it is to be transmitted. Each message received by and stored in buffer 208 consists of 6 bits specifying the time slot to which the stored information pertains, two control bits indicating the type of message (end of call, switchhook flash, etc.), and the BCD equivalent of a dialed digit if the message information represents a dialed digit.

The message remains in the output buffer 208 until it is retrieved under control of the scanner distributor 210. Next state logic 207 can apply a plurality of messages successively to the output buffer 208 and there may be either one or a plurality of messages in the buffer when it is scanned by scanner distributor 210.

The scanner distributor 210 scans buffer 208 periodically to determine whether it contains any messages. The scanner distributor proceeds on to other functions whenever a scan response from circuit 208 indicates the absence of a message. On the other hand, if a scan response indicates the presence of a message, the scanner distributor generates the control signals required to read out the message from buffer 208. If a plurality of messages are stored in the buffer, the scanner continues its scanning until all messages are read out.

Clock generator 204 provides a divide by 161 function as already described; it additionally provides the miscellaneous clocking, timing, sampling, and sequencing signals required to control the operation of the various circuits of FIG. 2.

DETAILED DESCRIPTION

FIGS. 3, 4, 5, 6, and 7, when arranged as shown in FIG. 11, disclose the circuit details of our invention. Elements on FIGS. 3 through 7 which directly correspond with those on FIGS. 1 and 2 have identical reference numerals wherever possible.

Figure 3:
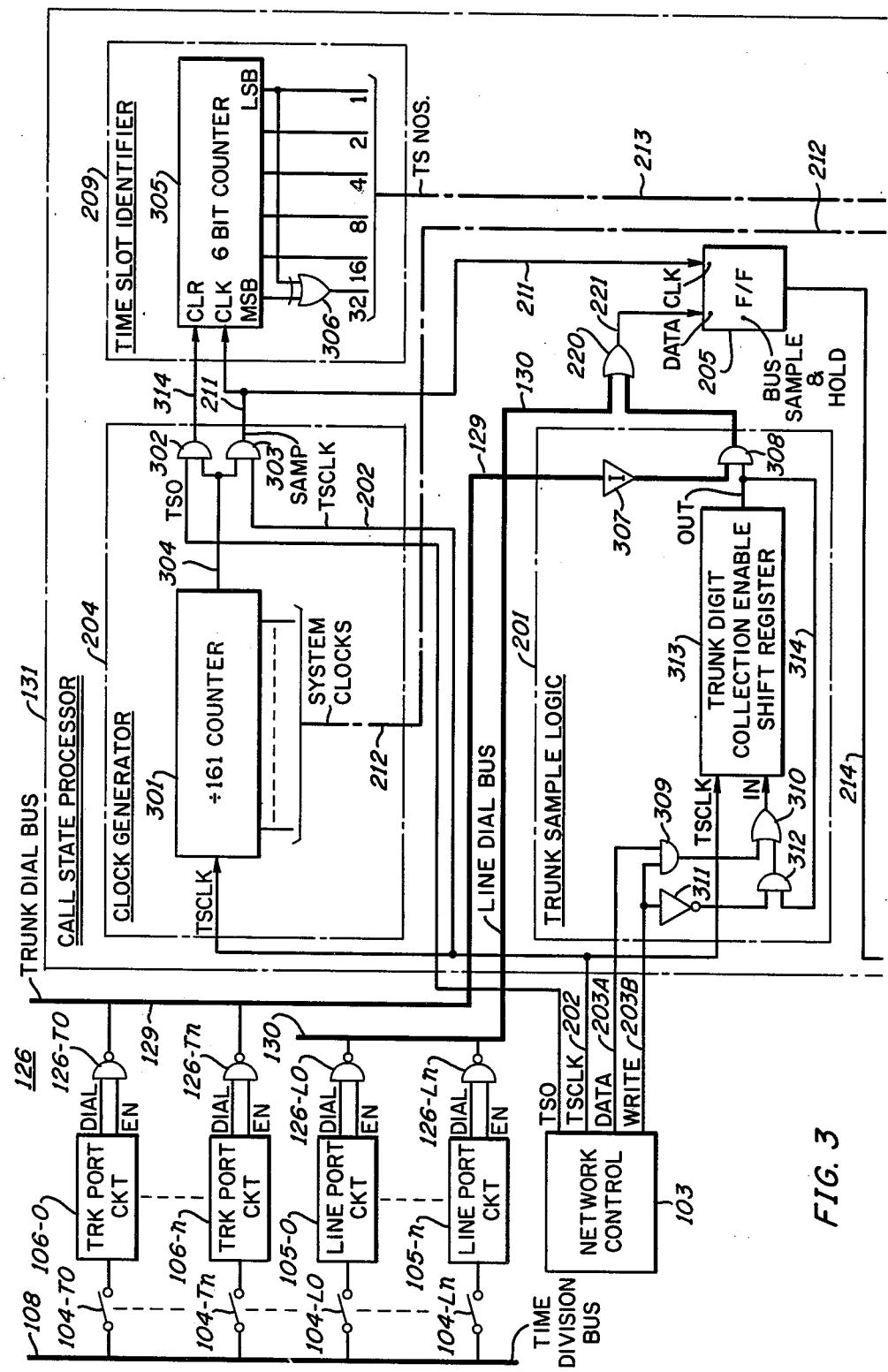
FIGS. 3 through 7, when arranged as shown in FIG. 11, disclose the circuit details of our subsystem.

The upper left-hand corner of FIG. 3 discloses the time division bus 108, the time division switches 104, trunk port circuits 106, line port circuits 105, line dial bus 130, and trunk dial bus 129. The time division switches 126 are shown in detail.

Each time division switch 126 comprises a two input NAND gate. The upper input (DIAL) of each NAND gate extends to its associated port circuit and extends internally within its port circuit to elements that monitor the supervisory state of the associated line or trunk to which the port circuit is connected. By this means, the upper input of each AND gate 126 receives hook state signals from its port circuit. The lower input (EN) of each NAND gate 126 is connected to the circuitry within its port circuit that receives a enable signal during each occurrence of a time slot to which a call currently served by the port circuit is assigned. This circuitry, as is well known, typically comprises a shift regsister which normally contains all zeros but which has a 1 written in an appropriate bit position of the register when the port circuit is assigned to a specific time slot for the serving of a call. In other words, if a call served by the port circuit is assigned to time slot 5, the shift register has a binary 1 written in its fifth bit position, all other bit positions contain a 0, and a step-by-step advancement of the shift register, under the control of the time slot clock, causes the shift register to read out a binary 1 during each occurrence of time slot 5. This binary 1 activates circuitry internal to the port circuit so that it closes its associated time division switch 104 to exchange speech samples with time division bus 108. The shift register also applies an enable pulse to the EN input of its AND gate 126. This signal enables the gate and extends the hook state signal on the DIAL input through the gate to line dial bus 130 for the line port circuits and to the trunk dial bus 129 for trunk port circuits.

Network control 103 (FIG. 3) generates output signals which control the rest of the circuitry on FIG. 3 including clock generator 204 and trunk sample logic 201. A pulse is applied to conductor TS0 during each occurrence of time slot 0. A pulse is applied to conductor TSCLK (time slot clock) (202) during each occurrence of every time slot. The time slot pulses on path 202 drive clock generator 204 and its counter 301 which produces one output pulse on path 304 in response to the reception of 161 time slot pulses. The pulse on path TS0 functions as a reset pulse and is extended through gate 302, under certain conditions, and over path 314 to the CLR input of the 6-bit counter 305 within time slot identifier 209 to reset it.

Clock generator 204 and time slot identifier 209 provide the timing and control pulses required by the call state processor of our invention. Each output pulse from the divide by 161 counter 301 is applied over path 211 to the CLK input of the sample and hold flip-flop 205 (FIG. 3). This enables the flip-flop and over path 221 sets it to the current hook state of the time slot specified by counter 305 within time slot identifier 209 (FIG. 3).

The call information represented by the flip-flop state is processed by comparing it with information pertaining to the same time slot on prior samples and stored in status memory 206. The processing of a sampled time slot continues for a maximum of approximately 161 microseconds at which time another output pulse is generated by counter 301 and the hook state information for another time slot is entered into sample and hold flip-flop 205. This 161-microsecond processing interval is sufficient for our circuitry to update call status information as required. Updating may or may not require a new message to be transmitted to the rest of the system via the scanner 210. In order to describe the operation of clock generator 204 and the time slot identifier 209 in further detail, let it be assumed that the switching system of which it is a part is of the 64 time slot type with the time slots being generated and applied to conductor 202 at a one microsecond rate. Every time slot reappears every 64 microseconds.

Let it be assumed that a pulse representing time slot 0 is applied over conductor 202 to counter 301. Let it further be assumed that the counter has already priorly received 160 pulses since last producing an output pulse. This being the case, the time slot 0 pulse is the 161st pulse the counter receives and it generates an output pulse which is applied over path 304 to gates 302 and 303. Gate 303 is enabled at this time by the TSCLK pulse and it therefore extends the output pulse of counter 301 over path 211 to the CLK input of counter 305 to advance it one position. Let it be assumed that this pulse advances the counter to its zero position.

Pulses representing other time slots are subsequently applied over path 202 to counter 301. However, since it is of the divide by 161 type, it generates no further output pulses until 161 additional input pulses have been received. The 161st input pulse that is received following the reception of the currently described pulse for time slot 0 represents time slot 33. This pulse is applied over path 304, through enabled gate 303, over path 211 to step counter 305 to its next position. If this counter were of the straight binary type, this pulse would advance the counter from its position 0 to a count representing a binary 1. However, it can be seen that the rightmost output conductor (1) of counter 305 also extends to the right-hand input of exclusive OR gate 306. This being the case, the high on the rightmost output conductor extends through gate 306 to the leftmost counter output conductor (32). Since both the rightmost and the leftmost output conductors are activated, the count represented by these two output conductors is a binary 33. Thus, counter 305 now applies a binary 33 to path 213. This corresponds to the time slot pulse now appearing at the output of counter 301 on path 304.

The control pulses generated by counter 301 and applied to path 212, together with the time slot identity signals specifying time slot 33 and applied to path 213, cause the rest of the circuit of FIGS. 3 through 7 to store the current hook state of time slot 33, to compare this information with that stored for time slot 33 from prior samples, and to update the call status of time slot 33 as required. Counters 301 and 305 operate in this manner with counter 301 producing one output pulse for every 161 input pulses and with counter 305 being activated by each output pulse from counter 301 to generate and apply to path 213 a binary signal representing the time slot now being sampled.

For a time division system having 64 different time slots in each of a series of cyclically recurring series of time slots, it can be shown that the divide by 161 counter 301 produces an output pulse representing time slots in the following sequence beginning with time slot 0; 0, 33, 2, 35, 4, 37, 6, 39, . . . 0, 33. This sequence is repeated every 10 milliseconds (approximately) so that the hook state of each active port circuit is sampled every 10 milliseconds.

Counter 305 advances one position in response to each out pulse from counter 301. The connection between output conductor 1 of counter 305 and the input of exclusive OR gate 306 causes a sequence of binary numbers to be applied to path 213 corresponding to the sequence of time slots represented by the pulses generated at the output of counter 301.

The time slot pulses that are applied once each microsecond to path 202 are extend to the lower input of gate 303 to partially enable it during the persistence of each pulse. The output pulse from counter 301 is applied to the upper input of this gate and, during the coincidence of a pulse on its upper and lower inputs, gate 303 is enabled to extend the output pulse from the counter 301 over path 211 to advance the counter 305 one position.

A pulse is applied to path TS0 during each occurrence of a pulse representing time slot 0. This pulse extends to the upper input of gate 302. The output of counter 301 extends to the lower input of the gate. The coincidence of a pulse on path TS0 and path 304 enables gate 302 which applies a pulse to counter 305 to reset it to its position 0 in the event that is is not already in that position due to a circuit malfunction or the like.

Each output pulse that is extended through gate 303 from counter 301 to counter 305 is also extended downward over path 211 to flip-flop 205. The hook state signals appearing on the line dial bus 130 are extended through OR gate 220 and over path 221 to the input of flip-flop 205. The hook state signals appearing on trunk dial bus 129 are extended to the trunk sample logic circuit 201 which permits the signals to be applied to OR gate 220 only during the occurrences of each time slot assigned to a trunk port circuit serving calls that are currently in a dial pulse receiving mode. Circuit 201 includes a shift register 313 which has a bit position unique to each time slot. There are 64 time slots in the system and thus shift register 313 has 64 bit positions. Each bit position corresponds to a different time slot and a 1 is written into a particular position of shift register 313 if the time slot associated with the position is currently serving a call in a dial pulse receiving mode and if the call is connected to a trunk port circuit.

Let it be assumed that time slot 0 is currently serving such a call; therefore, a binary 1 is written into the 0 position of shift register 313 as well as the shift register of the trunk port circuit serving the call such as, for example, port circuit 106-0 (FIG. 3). This being the case, during each occurrence of time slot 0, gate 126-T0 is enabled and it applies the current hook state of this trunk port circuit to bus 129. This signal is extended over the bus, through inverter 307 to the upper input of gate 308. The binary 1 in position 0 of shaft register 313 is read out at this time to enable the lower input of AND gate 308. The gate is now fully enabled and it passes the hook state signal from bus 129 to the lower input of OR gate 220. This signal passes through the gate and over path 221 to the data input of the sample and hold flip-flop 205.

Network control 103 applies time slot clock pulses over path 202 to the upper input of shift register 313 to step it from position to position. Network control 103 writes a 1 into the shift register by concurrently applying a high to both paths 203A and 203B extending to AND gate 309. This enables the AND gate and a binary 1 is extended through OR gate 310 to the lower input of the shift register to write a binary 1 in the position of the shift register corresponding to the currently active system time slot. Network control 103 writes a binary 0 into the shift register by applying a binary 1 to path 203B and a binary 0 to path 203A. This enables gate 309; neither input of OR gate 310 is activated; and gate 310 applies a binary 0 to shift register 313.

Network control 103 applies a 0 to path 203B when a write operation is not desired. This causes the information currently in the shift register to be recirculated. Path 203B is low at this time. This causes inverter 311 to apply a high to the upper limit of AND gate 312. This high partially enables the gate and permits the output information from the shift register on path 314 to recirculate from the register output through gates 312 and 310 back to the register input.

In partial summary, the sample and hold flip-flop 205 receives a sample pulse on path 211 every 161 microseconds with each received sampled pulse representing the system time slot whose hook state is to be sampled. This pulse enables the flip-flop which is then set either to a binary 1 or a binary 0 state depending upon the hook state signal applied to it from the output of OR gate 220. Each hook state signal entered into flip-flop 205 under control of a signal on path 211 is held for 161 microseconds until the next output pulse is generated by counter 301. During this 161-microsecond interval, flip-flop 205 applies the stored hook state signal over path 214 to the circuitry on FIGS. 4 and 6. This circuitry compares the current state of the sampled time slot with call information derived and registered for the same time slot on prior samples. From this comparison, the circuitry of FIGS. 4 and 6 determines whether the call status should be updated; if updating is required, it determines whether the updated call status requires a message to be transmitted to the rest of the system via a scanner distributor 210.

Random access memory 401 (FIG. 4) stores call status information for each active system time slot. This memory is of the 1024 by 1 type. Namely, it is one bit wide and 1024 bits long. The status information for each time slot occupies 16 consecutive memory addresses and is referred to as a status word. The status word structure is shown in FIG. 8 wherein the bits may be defined as follows. The PT bits (bits 0–3) comprise a pulse timer that is incremented at 10 millisecond intervals. The timer is initialized to a binary 0110 (6). The timeout state of the counter is 0000; this corresponds to ten increments from the initialized state or 100 milliseconds. This timer is used to distinguish on-hook and off-hook transitions that represent dial pulses from those that represent hook flashes, call abandonment, or a permanent off-hook or on-hook condition.

The BUS bit (bit 4) specifies the hook status of the bus the last time its time slot was sampled. A binary 1 indicates an off-hook; a binary 0 indicates an on-hook. The VAL bit (bit 5) specifies a validated switchhook status for the time slot. The VAL bit changes state only when its associated time slot changes to the opposite hook state for at least two consecutive samples. Bit STBL (bit 6) indicates whether or not VAL bit has changed state within the last 100 milliseconds. A binary 1 for bit STBL indicates that bit VAL has not changed state during this interval; a binary 0 indicates that bit VAL has changed state within the last 100 milliseconds. The four PC bits (bits 8–11) are used as a single digit dial pulse counter. The binary value of these four bits specify the value of the dialed digit.

RAM 401 is addressed during each 161-microsecond interval and reads out the status word for the sampled time slot whose current hook status is stored in flip-flop 205. The status information is read out in two half-word segments, bit-by-bit, from the memory 401 over path 414 and is entered into the 8-bit shift register 402. From there, it is transmitted in parallel as two half-word segments to the circuitry of FIG. 6. The circuitry of FIG. 6 compares the currently samples hook state of the time slot as received on path 214 with the hook state information contained in the stored status word.

The six high order address bits for memory 401 are applied to it over path 213 from counter 305. These six bits specify the time slot which is currently being sampled and whose call status is being processed during the current 161-microsecond interval. These six bits define the beginning address of a 16-bit word within memory 401. The four lower address bits are provided by circuit 403 over paths 416 to memory 401. These four bits specify, one at a time, each of the 16 bits within the 16-bit status word specified by the address information on path 213. The address on path 213 remains constant for the duration of the 161-microsecond processing interval. The bits on path 416 change sequentially so that the individual bits of the 16-bit status word are read out sequentially to shift register 402.

Figure 6:
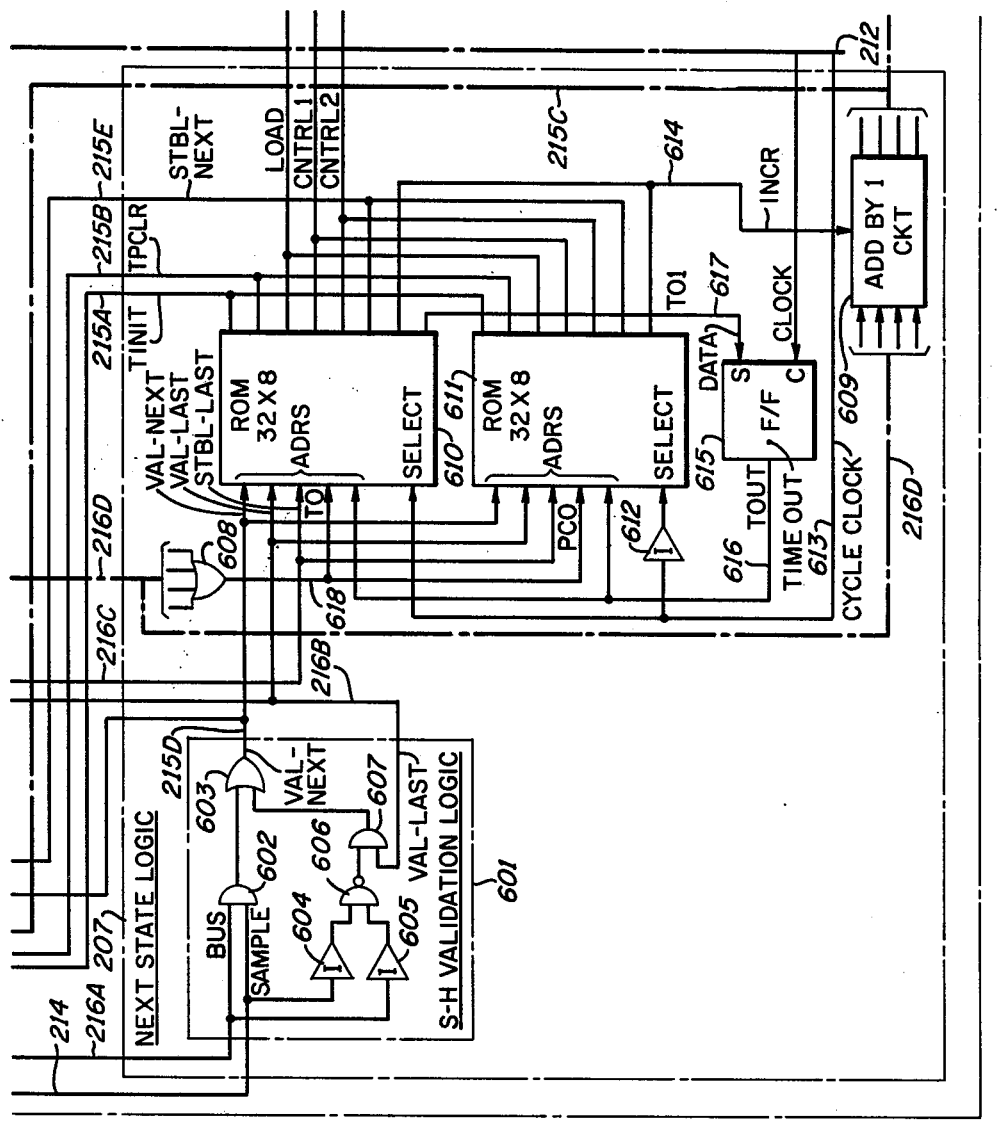

In order to save hardware, the exchange of information between RAM 401 and the circuitry of FIG. 6 is performed 8 bits at a time in two separate cycles as shown on FIG. 10. Cycle A and cycle B together represent the 161 microseconds of processing time allocated to each sampled time slot.

Bits 0 through 7 of the status word of FIG. 8 are read out of memory 401 and into shift register 402 during the first 40 microseconds of the 161-microsecond interval. This is shown as the read portion of cycle A on FIG. 10. These bits are then transmitted to the circuitry of FIG. 6; the information represented by these bits is combined with the signal on path 214 representing the current hook state of the time slot. The circuitry of FIG. 6 processes and updates this information. On the write portion of cycle A (the next 40 microseconds) the results of the processing are applied back to the circuitry of FIG. 4 over path 215 and, in particular, to the input of the multiplexor 404. The information received by the multiplexor is read sequentially bit by bit back into memory 401 as a status word under control of the address bits on path 416 during the second half of cycle A.

During the next cycle, cycle B on FIG. 10, the three status bits (bits 4, 5, 6), unused bit 7, and the four PC bits (bits 8–11) are read out of memory 401 and into shift register 402. The reason for this bit sequence is subsequently described. From there, they are applied to the circuitry of FIG. 6 which updates this information and transmits it back over path 215 to multiplexor 404. The updated information is then reentered into memory 401.

Multiplexor 404 receives parallel input information on path 215 from FIG. 6 and converts it into serial form and transmits it over path 418A, through gates 406, 407, and path 418 to the data input of memory 401. Memory 401 is rewritten with the information on path 418 under control of the bit address information on path 416. Path 417 is enabled only on a write operation.

Figure 12:
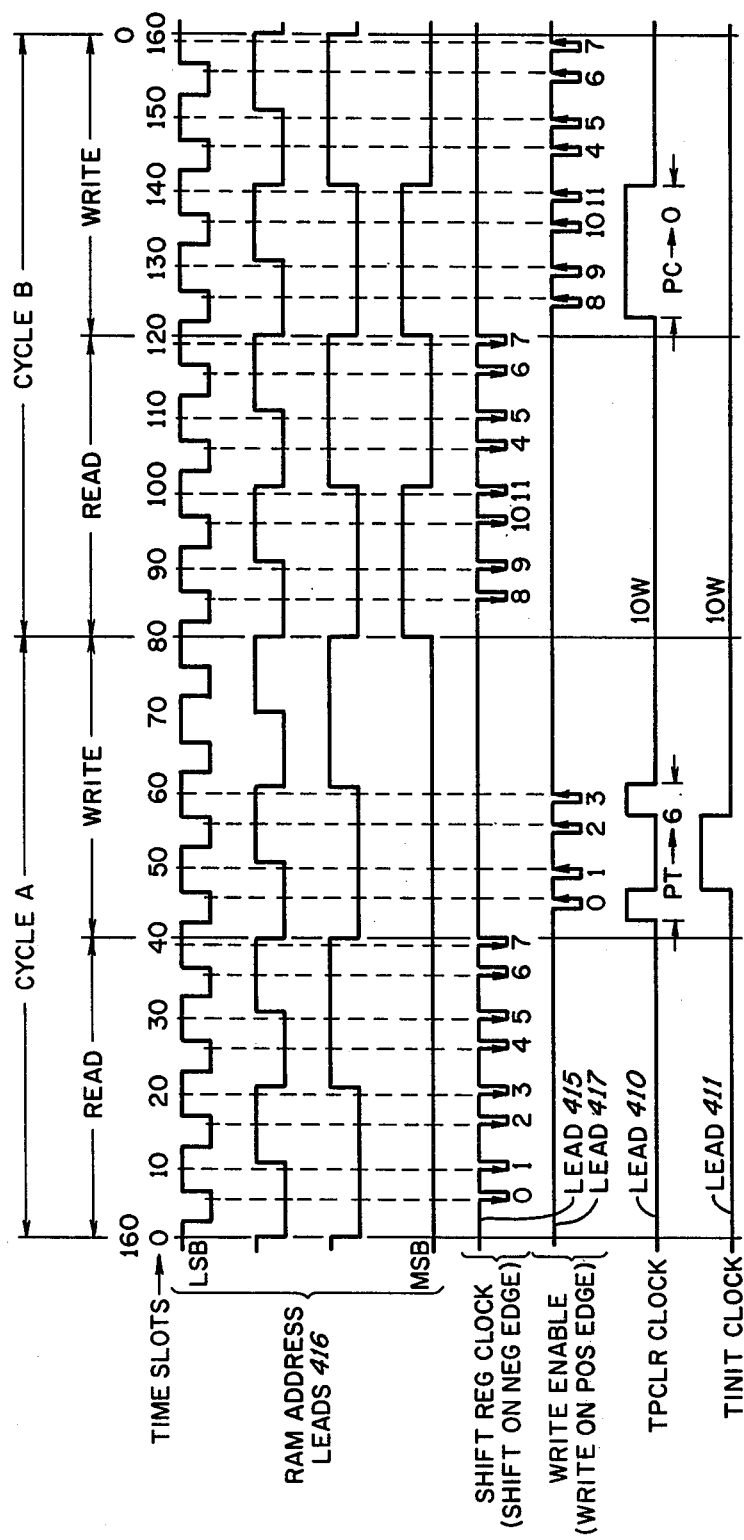

FIG. 12 is a timing diagram that illustrates the signals supplied by circuit 403 to control the readout of information from memory 401 as well as to control the write operation in which the information generated by the circuitry of FIG. 6 is applied via multiplexor 404 to memory 401. A study of FIGS. 4, 8, 10, and 12 together will facilitate a more complete understanding of the operation of the circuitry of FIG. 4.

As shown on FIG. 12 and as already mentioned, the information processing for a currently sampled time slot takes place during the 161-microsecond interval in which flip-flop 205 remains set with information representing the present hook state of the currently sampled time slot specified by counter 305. The top line of waveforms (LSB) on FIG. 12 represents a sequence of 161 time slots (0 through 160), which occupy an interval of 161 microseconds, and it illustrates the relationship between the time slots and cycles A and B. The top four lines together represent the signals applied to address leads 416 by circuit 403 as the memory 401 is read out and written into on cycles A and B. The top most one of these four lines (LSB) represents the least significant bit of binary address information; the bottom most one of these four lines (MSB) represents the most significant address bits. The next line below is designated "lead 415" and it represents the clock pulses applied to shift register 402 as the memory is read out. The shift register responds to the negative going pulse transition of each clock pulse and is written with the information then read out of memory 401. Each clock pulse (0–7) for lead 415 on FIG. 12 is designated with the numerical value of the address signals supplied to memory 401 by address leads 416. The arrow on each pulse on lead 415 indicates the time at which the address signals on leads 416 are to be determined. This address represents the bit position of the status word being read out. Thus, memory 401 receives a binary 0000 on leads 416 when clock pulse 0 is received on lead 415. The contents of bit 0 of the status word of FIG. 8 are then read out of memory and entered into the shift register.

The first eight pulses (0–7) on lead 415 write into shift register 402 bits 0 through 7 of the status word defined by the address bits applied by path 213 to the upper address inputs of memory 401. The rightmost four bits (0–3) now in the shift register represent the pulse timer information; namely, the number of milliseconds that have elapsed since the last change in hook state of the samples time slot. These bits are now applied to path 216D by the shift register. The contents of bits 4, 5, and 6 of the status word (BUS, VAL, STBL) are stored in the bit positions 4, 5, and 6 of the register and are applied to paths 216A, 216B, and 216C. Bit 7 is not used.

Even though bits 0 through 7 of the status word are read out of memory 401 and entered into the shift register on cycle A, only the PT bits (0 through 3) are updated at this time by the circuitry of FIG. 6. The updated PT information is next written into memory 401 at the times shown by the arrows on the four pulses on write enable lead 417 on FIG. 12. These four pulses are designated 0, 1, 2, and 3; they are generated during the write portion of cycle A; and, at this time, the four updated PT bits are extended via multiplexor 404 and written into memory 401 under control of the address signals applied to memory 401 by leads 417. The pulses on lead 417 write into memory the information applied to lead 418.

Figure 4:
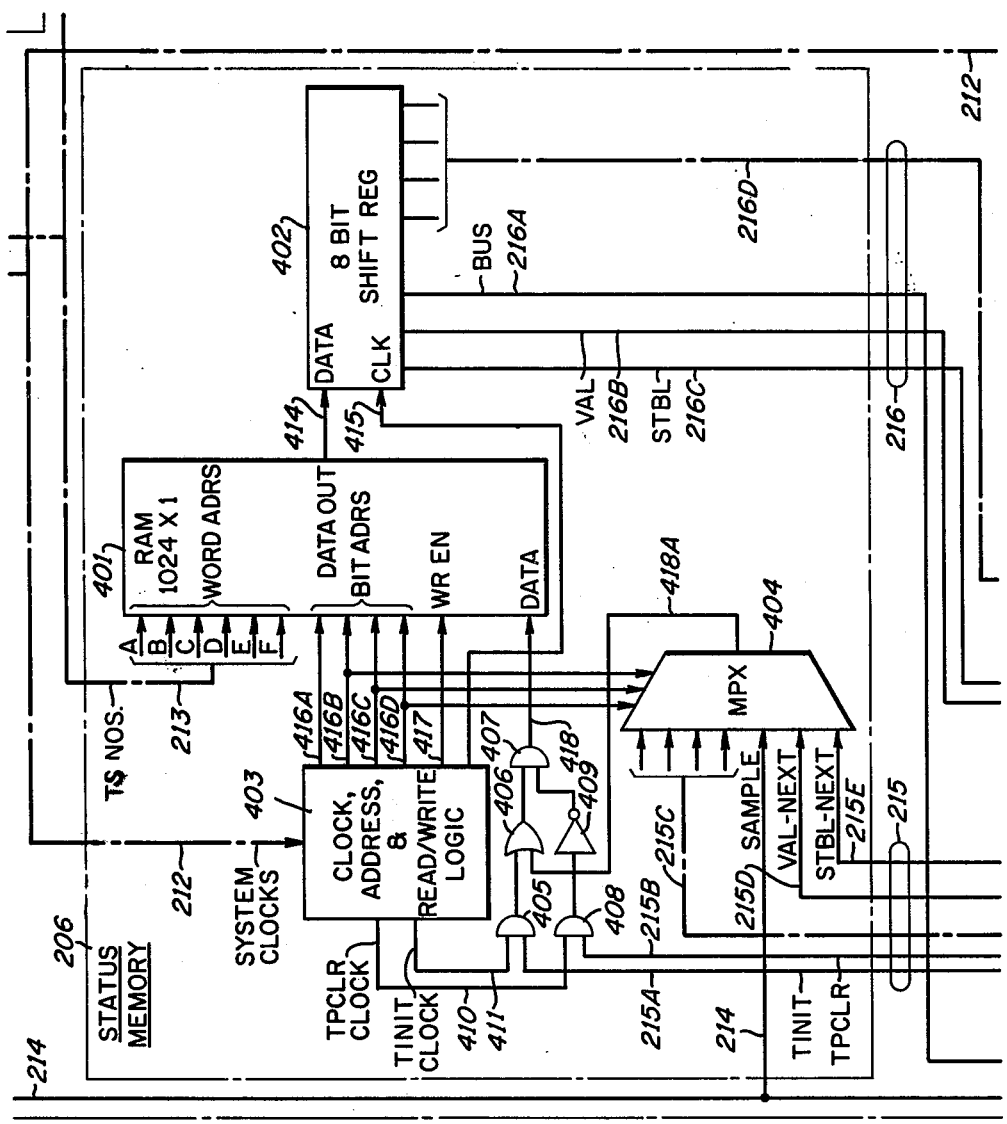

In partial summary, cycle A is concerned with the readout of the pulse timer information from memory 401 into shift register 402, the transmission of this timer information to the circuitry of FIG. 6, the updating of this information, the return of this information to the circuitry of FIG. 4 via path 215C to the upper four inputs of multiplexor 404, and the writing of the four updated PT bits into bits 0 through 3 of the status memory word. This writing operation occurs at the times at which the arrows occur on the pulses designated 0, 1, 2, and 3 as shown on FIG. 12 for the write enable lead 417. Bits STBL, VAL, and BUS are used as control bits on cycle A as subsequently described.

The righthand portion of FIG. 12 illustrates the memory read and write operation for cycle B. The top four lines represent the binary state of the four RAM address leads 416 at the time the leading edge of the shift register clock pulses are applied to leads 415. Each clock pulse on lead 415 is designated numerically to indicate the binary value of the address information applied to leads 416 at each stage of the read operation for cycle B. Thus, the information stored in bit positions 8, 9, 10, 11, 4, 5, 6, and 7, in that order, of the status memory word shown in FIG. 8 are read out of memory 401 and entered into the shift register 402 during the read portion of cycle B. Bits 8, 9, 10, and 11 are read out first, they specify the four PC bits; these four bits are entered into the four rightmost bit positions (0, 1, 2, 3) of the shift register 402; and they are then applied from the shift register over path 216D to the circuitry of FIG. 6. Bits 4, 5, 6, and 7 are the last four bits to be read out of memory on cycle B; they are entered into the bit positions 4, 5, 6, and 7 of the shift register; and the last bit, bit 7, is not used. Bits 4, 5, and 6 (BUS, VAL, STBL) are applied, respectively, to paths 216A, 216B, and 216C.

The shift register contents are now transmitted to FIG. 6. This circuitry processes and updates the information as required and returns the updated information to multiplexor 404 for entry into memory 401 on the write portion of cycle B. Each bit is written into the memory at the time indicated by the arrows on the pulses on the write enable lead 416 on FIG. 12. The write enable pulses are designated numerically to correspond to the binary address information appearing on address leads 416 as each bit is written into the memory. The write enable pulses are designated 8, 9, 10, 11, 4, 5, 6, and 7, in that order, and they cause the updated PC information and the three updated status bits to be written into the indicated bit position of the status memory word under control of the time slot information signals on path 213.

The following describes the operation of gates 405–409. Output conductors 410 and 411 from element 403 are normally low. This holds the output of AND gate 408 low and, in turn, the lower input of AND gate 407 high. This partially enables gate 407 so that output signals from multiplexor 404 on path 418A can extend through OR gate 406 and AND gate 407 to the DATA input of memory 401 over path 418. The low on path 411 holds AND gate 405 off.

Conductors 410 and 215B are both made high wherever it is desired to override the output of multiplexor 404 and to write a 0 into memory 401. The high on conductors 410 and 215B extends through AND gate 408 to the input of the inverter 409. The inverter output applies a low to the lower input of gate 407. This disables AND gate 407 and causes a 0 to be written in the memory.

Conductors 411 and 215A are both made high when it is desired to write a 1 into the memory. The high on both inputs of AND gate 405 is extended from its output, through OR gate 406 to the upper input of AND gate 407. The lower input of the gate is high at this time because of a low on conductor 410 and, therefore, a 1 is extended through gate 407 to the data input of memory 401.

In summary, the activation of AND gate 405 when both conductors 411 and 215A are high, extends a 1 through OR gate 406 and AND gate 407 to write a 1 into memory 401. Conversely, AND gate 408 is activated by the application of a 1 to both paths 410 and 215B. This causes a 0 to be generated at the output inverter 409 to hold AND gate 407 off so that 0s are written into the memory 401. Path 410 is a low during normal system conditions. This holds the output of inverter 409 high so that AND gate 407 is partially enabled. This permits the output of AND gate 407 to follow the signals applied to its upper input by the output of multiplexor 404 on path 418A. This causes the multiplexor output to be written into the memory 401 during normal system conditions.

With reference to FIG. 12, the four write enable pulses that are applied to lead 417 during the write portion of cycle A normally cause the multiplexor output on path 418A to be written into bit positions 0, 1, 2, and 3 of the memory status word to update the pulse timer. However, it is periodically required that this timer be reset to a binary 6. This is done by the application to paths 410 and 411 of the signals shown on the bottom two lines of FIG. 12. Specifically, leads 410 and 215B (TPCLR) go high during the occurrence of the write enable pulse on lead 417 for bit 0. This enables AND gate 408, disables AND gate 407, and causes a 0 to be written into bit position 0. Next, leads 411 and 215A (TINIT) are driven high during the occurrence of the write enable pulses for bit positions 1 and 2. Lead 410 returns to a low. This enables AND gates 405 and 407 to write a binary 1 into bit positions 1 and 2. Next, leads 410 and 215B again go high during the occurrence of the write enable pulse for bit position 3. This causes a binary 0 to be written into this bit position.

The write portion of cycle B normally causes the multiplexor output to be written into bit positions 8, 9, 10, 11, 4, 5, 6, and 7, in that order, as indicated by the designation of the write enable pulses on lead 417. However, it is periodically desired to reset to 0 the pulse counter bits in position 8, 9, 10, and 11. This is done by driving leads 410 and 215B (TPCLR) high during the occurrences of these four write enable pulses in a manner similar to that already described in connection for of cycle A. This resets the PC counter to 0 so that it can count additional dial pulse signals.

The following describes the manner in which the circuitry of FIG. 6 receives a signal indicating the current hook state of a sampled time slot and how it compares this signal with information already stored in RAM 401 for the same call to determine whether the call status should be updated or left unchanged. The circuit of FIG. 6 also determines whether a message should be transmitted to the circuitry of FIGS. 5 and 7 and, in turn, to the rest of the system via scanner distributor 210.

The circuit of FIG. 6 performs its operations by comparing the hook state of the call on successive samples of the assigned time slot by sample and hold flip-flop 205. On each such sample, the current hook state is transmitted from flip-flop 205, over path 214 to the lower input of AND gate 602 in the validation logic circuit 601. A signal (BUS) representing the hook state of the call on the immediate prior sample for the corresponding time slot is concurrently read out of shift register 402 and applied over path 216A to the upper input of AND gate 602. If the two input signals to the gate are identical, an output signal from gate 603, termed VAL-NEXT, is generated which is equal to the SAMPLE signal on path 214. On the other hand, if the signals on paths 214 and 216A are not the same, the VAL-NEXT signal at the output of OR gate 603 is equal to the signal which is received over path 216B and applied to the lower input of AND gate 607. This signal is termed VAL-LAST and it represents the validated state of the call as recorded in VAL bit 5 of the status word in RAM 401.

In order to describe the operation of the validation logic circuit 601, the following different states of the SAMPLE signal 214 and BUS signal 216A are described. A binary 1 represents an off-hook signal; a binary 0 represents an on-hook signal. Let it first be assumed that the SAMPLE and BUS signals are both a binary 1. In this case, the two inputs of AND gate 602 are a 1, the output of the gate is a 1; and this 1 extends through OR gate 603 to cause a 1 to be generated for the VAL-NEXT signal. Next, let it be assumed that both the SAMPLE and BUS signals are 0s. Both inputs of AND gate 602 are 0s, the gate is turned off, and a 0 is applied to the upper input of OR gate 603. The 0s on paths 214 and 216A are inverted by inverters 604 and 605 to cause the inverting AND gate 606 to apply a 0 to the upper input of AND gate 607. This holds AND gate 607 off and causes a 0 to be applied to the lower input of OR gate 603. Both inputs of the OR gate are now 0 and, therefore, a 0 is applied to its output as the VAL-NEXT signal. From the preceding, it may be seen that the output of gate 603, the VAL-NEXT signal, is equal to the SAMPLE and BUS signals whenever both of these signals are equal. This corresponds to the prior statement that if the current state of the sample signal on path 214 and the state BUS signal from the prior sample are the same, then VAL-NEXT equals the current state of the SAMPLE signal.

The following describes the operation of circuit 601 under conditions in which the SAMPLE and BUS signals are different. This condition occurs when the SAMPLE signal is a 1 while the BUS signal is a 0 and vice versa. Gate 602 remains turned off under such conditions and applies a 0 to the upper input of OR gate 603. Gate 606 also remains off and applies a binary 1 to its output under such conditions to enable the upper input of AND gate 607. With this gate partially enabled, the VAL-LAST signal on conductor 216B is effectively gated through AND gate 607 and through OR gate 603 to generate the VAL-NEXT signal. Thus, under conditions in which the SAMPLE and BUS signals are different, the validation logic circuitry 601 applies an output signal to the VAL-NEXT conductor 215D that is equal to the VAL-LAST signal on path 216B. This corresponds to the prior statement that if the SAMPLE signal and the last BUS signal are not the same, then VAL-NEXT equals VAL-LAST.

In summary, the first step of the call state computational process is to determine the next validated state of the sampled call. This next state is termed VAL-NEXT. To do this requires three input signals, namely; the SAMPLE signal on path 214, the last look BUS signal on path 216A and the last validated state signal (VAL-LAST) on path 216B. If SAMPLE and BUS are the same, then VAL-NEXT equals SAMPLE. If SAMPLE and BUS are different, then VAL-NEXT equals VAL-LAST.

For next state computational purposes, the only important state for both the pulse timer (the PT bits) and the pulse counter (the PC bits) is 0000 (timeout and no pulses received, respectively). This greatly simplifies the call state detection done on the PT bits on path 216D during cycle A and on the PC bits on the same path during cycle B. Path 216D extends to the four inputs of OR gate 608. This gate performs an all 0s detection and applies a binary 0 to the T0 input of ROM 610 during cycle A whenever a PT counter timeout is detected; it applies a 0 to the PC0 input of ROM 611 during cycle B whenever the detected pulse count equals a 0. Path 216D also extends to the input of the add by one circuit 609 which adds a 1 to the PT count and the PC count under specified conditions as subsequently described.

Most of the next state logic is stored in ROMs 610 and 611 which, for the purpose of the present disclosure, advantageously may be of the 32 by 8 type. ROM 610 is used in cycle A and ROM 611 is used during cycle B. Most of the input and output conductors of the two ROMs are effectively connected in parallel with each other. The ROM inputs are on the left and beginning at the top and extending downwardly the inputs are VAL-NEXT, VAL-LAST, STBL-LAST, the output of the all 0s detector 608 (T0 on ROM 610 and PC0 on ROM 611), and a timeout input (TOUT). The bottom input conductor of both ROMs is the SELECT input which is directly connected to path 613 for ROM 610 and is connected to path 613 by means of inverter 612 for ROM 611. Path 613 is part of path 212 and receives a signal from clock generator 204 to activate ROM 610 on cycle A and ROM 611 on cycle B.

The outputs of ROMs 610 and 611 are generally connected in parallel as shown in FIG. 6. The following describes the function of each output conductor. Conductor TINIT (TIMER INITIALIZE) is a 1 whenever the PT timer is to be initialized. Conductor TINIT extends from FIG. 6 to the lower input of AND gate 405. TINIT goes high for the last half of cycle A. This partially enables gate 405. Lead 411 then goes high and fully enables gate 405. This high is propagated through gates 405, 406 and 407 to the data input of the RAM 401 to initialize the pulse timer bits to a count of binary 6 (0110) as priorly described. The high on lead TINIT controls the writing of a 1 into bits 1 and 2 of the status word.

Output conductor TPCLR (timer/pulse counter clear) is driven high when it is desired to write 0s into the status word of RAM 401 to initialize either one or both of the PT and PC counters. ROM 610 controls the PT timer and it selectively drives leads TINIT and TPCLR high to initialize the PT timer during cycle A. The TPCLR and TINIT leads extend to the gate circuitry of FIG. 4. As shown in the timing diagram of FIG. 12, the two clock leads 410 and 411, together with a 1 on each of leads TINIT and TPCLR from ROM 610 initialize the PT timer to a count of binary 6 as priorly explained. Specifically, lead 410 receives a 1 during write enable bits 0 and 3, lead 411 receives a 1 during write enable bits 1 and 2.

ROM 611 is active on cycle B and at this time the PC counter can be reset to 0 by a binary 1 being applied to the TPCLR conductor. This signal and the 1 on lead 410 during the occurrence of write enable bits 8, 9, 10, and 11 reset the PC counter bits to 0.

The next three output conductors are designated LOAD, CNTRL1, and CNTRL2, respectively. The LOAD conductor is driven high in combination with one or both of conductors CNTRL1 and CNTRL2 when a message is transmitted to the circuitry of FIGS. 5 and 7. This is subsequently described in detail.

The STBL-NEXT (stable next) lead receives a signal from ROM 611 on cycle B indicating the value of the STBL bit of FIG. 8 that is next to be recorded.

The next output lead of each ROM is the INCR lead 614. This lead extends to element 609 and it is set to a binary 1 whenever it is desired to increment the PT or PC counters. The reception of a 1 by element 609 causes it to add a 1 to the binary quantity it is currently receiving from path 216D. The incremented count is then transmitted over path 215C to the circuitry of FIG. 4 where it is entered into the appropriate location of RAM 401. The incremented pulse count may also be sent to the circuitry of FIG. 7 for transmission in an output message to system control.

Output conductor T01 of ROM 610 is not connected to a corresponding conductor of ROM 611. A binary 1 on this lead is extended to the S input of the timeout flip-flop 615 to switch it to a set state when a clock pulse is received on its C input. This timeout signal is generated by ROM 610 on cycle A, is stored by the flip-flop, and is used by ROM 611 during cycle B when the timeout indication is transmitted over path 616 as an address signal to ROM 611.

Figure 13:
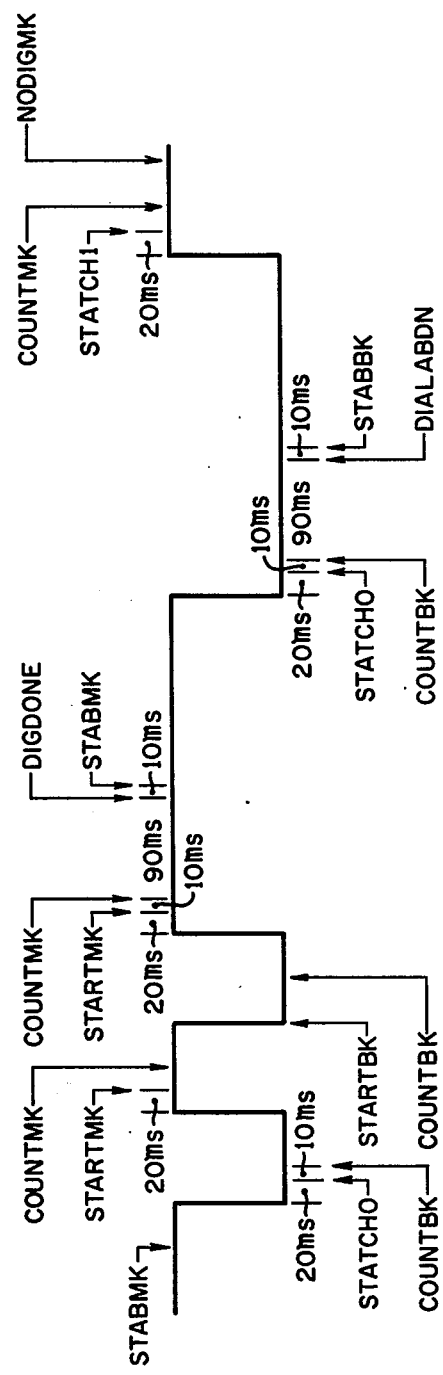
FIG. 13 is a timing diagram that illustrates one possible sequence of call states.
Figure 15:
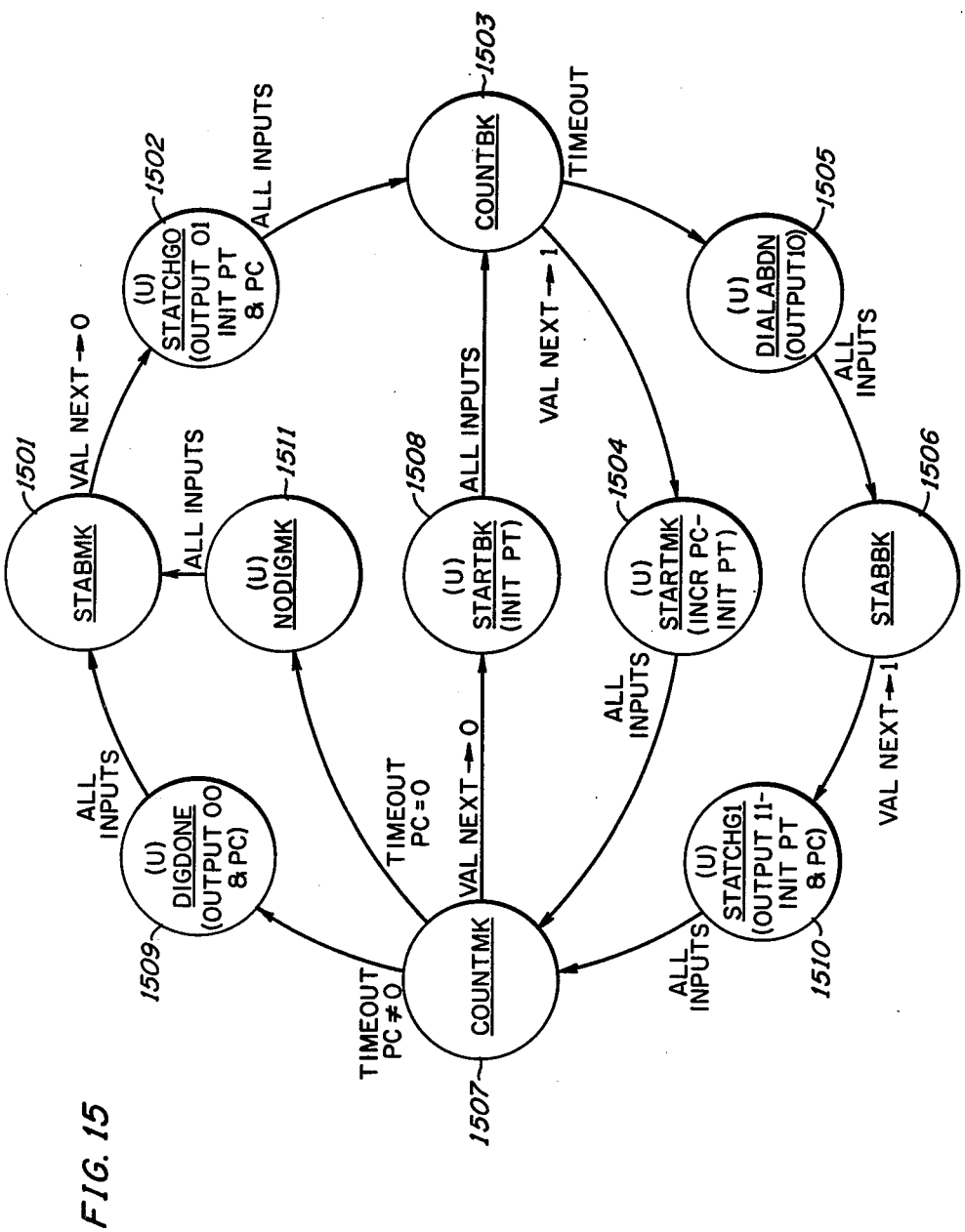
FIG. 15 is a call state transition diagram which illustrates the sequences in which the various call states may occur.

The following describes the interaction between the circuitry of FIG. 4 and FIG. 6 as successive samples from flip-flop 205 are received as a call progresses from state to state beginning with an originally detected off-hook detection. In addition to FIGS. 4 and 6, a reference to FIGS. 13, 14, and 15 is useful in connection with the following discussion. FIG. 13 discloses the on-hook/off-hook wave form for a call segment; FIG. 14 illustrates ROM 610 and 611 input and output signals for each call state; FIG. 15 is a state diagram which illustrates the various call states together with the sequence in which the call state processor of the present invention sequences from state to state during the serving of a call.

It has already been mentioned that validation logic circuit 601 analyzes the state of the SAMPLE signal on path 214 on successive samples of the same time slot by flip-flop 205; it has also been mentioned how circuit 601 compares each such sample with the SAMPLE signal from the immediate prior sample and how it derives a VAL-NEXT signal which is outputted from gate 603 to the input of ROM 610 and 611 as address information. This same signal is further transmitted over path 215D to multiplexor 404 and from there into bit 5 of the associated call status word in RAM 401.

On FIG. 13, the initial state of the call is represented by the leftmost off-hook condition on the portion of the wave form designated STABMK (stable make). This state is also indicated on the topmost circle (1501) of FIG. 15. This condition comprises a prolonged off-hook state as the call is initiated. During this state, the value of each successive sample equals the value of the SAMPLE signal on the last sample. Therefore, under such conditions as already described for circuit 601, the VAL-LAST signal read out of RAM 401 on path 216B for the status word associated with the call equals current sample on path 214 and, in turn, the VAL-NEXT signal generated by circuit 601 which is then read back into RAM 401. This condition normally persists for over 100 milliseconds and, therefore, the value of the STBL bit for the status word becomes and remains a 1 indicating that the call has not changed state for over 100 milliseconds.

The ROM 610 and 611 input signals for each possible call state are shown on the left half of FIG. 14; the ROM output signal for each state are shown on the right half. The STABMK state is shown on line 1 of FIG. 14. During the STABMK state the VAL-NEXT signal is a 1, the VAL-LAST signal is a 1, and the STBL-LAST signal on path 216D is a 1 since the call has remained stable for over 100 milliseconds. The state of the timer T0 and the pulse counter PC0 are of no concern at this time and may be ignored (they may be either a 0 or a 1).

The various columns on the righthand portion of FIG. 14 represents call state information read out of the ROMs 610 and 611 in response to the reception of the input signals shown on the lefthand portion of FIG. 14. The ROM output signals for the STABMK state are: STBL-NEXT is a 1, INCR is a 1 on cycle A to increment the PT counter by 1, the state of the next three columns is of no concern and is therefore represented by an X, the LOAD signal is a 0 since there is no message at this time for transmission back to system control. The state of the CONTRL1 and 2 output conductors is of no concern and is represented by an X.

The STABMK off-hook state persists until the subscriber commences dialing. The beginning of the first dial pulse representing the first digit results in an on-hook or open state which persists for less than 100 milliseconds. This condition is represented by the first negative going pulse on FIG. 13.

It should be remembered that each time slot is sampled by flip-flop 205 once every 10 milliseconds. It should also be recalled that the VAL-NEXT signal does not change state until the SAMPLE signal on path 214 has changed state for two successive samples. On FIG. 4, path 214 changes state from a 1 to a 0 the first time the call is sampled during the first on-hook condition. The first two on-hook samples of the first pulse occur within 20 milliseconds of the beginning of the pulse since the call is samples every 10 milliseconds by flip-flop 205. The value of the VAL-NEXT signal switches from a 1 to a 0 after path 214 is a 0 for two successive samples.

With the VAL-NEXT signal equal to 0 and with the VAL-LAST signal equal to 1, the state of the call changes from STABMK state as shown on line 1 of FIG. 14 to the STATCHGO state as shown on line 2. The ROM input signals have the following values for STATCHGO state: VAL-NEXT equals 0, VAL-LAST equals 1, STBL-LAST equals a 1 since a 1 is currently stored in bit position 6 for the status word of this call in RAM 401. This 1 was entered during the STABMK state by the STAB-NEXT signal. The value of the PC0 and T0 bits are of no concern at this time.

ROMs 610 and 611 generate the following output signals during the STATCHGO state: STBL-NEXT is a 0 since the call has changed state within the last 100 milliseconds. INCR PT is a 0. It is immaterial whether the PC is incremented. A 1 is applied to conductor TINIT and, in turn, to the lower input of AND gate 405 to initialize the PT counter bits of FIG. 8 to a binary 6 (0110). A binary 1 is also applied to the TPCLR lead and, in turn, to the lower input of AND gate 413 to initialize the PT counter as well as the four PC bits representing the pulse counter. A binary 1 is also applied to the LOAD conductor extending to FIGS. 5 and 7 to prepare that circuit for the reception of a message. This message is represented by a 0 on the CONTRL1 lead and a 1 on the CONTRL2 lead. This message is transmitted to and temporarily stored in the circuitry of FIGS. 5 and 7. It is subsequently read out and transmitted to the system control to advise it that the call status has changed from that of a STABMK condition to a STATCHGO on-hook condition that may possibly represent the first pulse of a dialed digit.

The transition of a call from a STABMK to a STATCHGO condition is shown on FIG. 15. FIG. 15 depicts the fact that the call status changes when VAL-NEXT goes to 0. It further indicates that during the STATCHGO state an output message of 01 is generated and that the PT and PC counters are initialized. The U within circuit 1502 indicates that STATCHGO is a temporary status that persists only for one sample by flip-flop 205.

With reference to FIGS. 13 and 14, the state of the call on the next sample by flip-flop 205 is changed from STATCHGO to COUNTBK when the VAL-NEXT signal from validation logic circuit 601 again is 0. This state is shown for the first negative pulse on FIG. 13 as being immediately to the right of the STATCHGO state. This COUNTBK state is also shown on the third line of FIG. 14.

The ROM 610 and 611 inputs have the following values for the COUNTBK state: VAL-NEXT equals 0 since it is assumed that the current on-hook state equals the first digit of a dialed pulse, rather than a hit, and therefore path 214 indicates an on-hook state for two successive samples; VAL-LAST is a 0 since VAL-NEXT from the STATCHGO state was a 0; STBL-LAST equals a 0 since the call has changed state within the last 100 milliseconds; the value of the PC0 bit is immaterial at this time as indicated by the X; and the T0 bit is a 1 indicating that a timeout condition of 100 milliseconds or greater for the PT timer has not occurred since the beginning of this hook state change.

ROMs 610 and 611 generate the following output signals for the COUNTBK state: STBL-NEXT is a 0 indicating that the call has changed hook state within the last 100 milliseconds: INCR PT is a 1 indicating that the PT timer is to be incremented during cycle A; INCR PC is a 0 indicating that the PC counter is not to be incremented; the TINIT and TPCLR leads are both a 0 since the PC and PT counters are not to be reset; LOAD is a 0 indicating a no message state; and the signals applied to the CONTRL1 and 2 leads are immaterial at this time. The COUNTBK state is shown as circle 1503 on FIG. 15.

The duration of the first dial pulse (the leftmost one) on FIG. 13 is somewhat less than 100 milliseconds; therefore, the call will remain in an on-hook condition and be sampled by flip-flop 205 a number of times subsequent to the first occurrence of the COUNTBK state. Path 214, the VAL-NEXT and VAL-LAST signals all remain 0 or on-hook on each such successive sample and therefore the call remains in the COUNTBK status. If the call should remain in the on-hook condition indefinitely, this would indicate a call abandonment and the status would change to DIALABDN as shown on FIG. 15. This abandonment condition would be detected by the PT counter which is initialized to a binary 6 during the STATCHGO state and which is incremented one count on each successive call sample during the COUNTBK state. After ten such samples or 100 milliseconds, the PT counter is advanced from a binary 6 (0110) through a binary 15 (1111) and then to a binary 0 (0000). This all 0s signal is applied over path 216D OR gate 608. The 0 at the output of the gate is used as address information by ROMs 610 and 611.

With reference to FIG. 14 and the DIALABDN state on line 4, the following input signals are applied to ROMs 610 and 611; VAL-NEXT equals 0, VAL-LAST equals 0, STBL-LAST is a 0 from the 0 for the STBL-NEXT output of the COUNTBK state; the value of PC0 is immaterial, and the T0 input to ROM 610 is a 0 to indicate a timeout condition. The following output signals are generated by ROMs 610 and 611 for the DIALABDN state; STBL-NEXT is a 1 indicating that the call has not changed state within the last 100 milliseconds, the INCR PT signal is a 1, the INCR PC, TINIT, and TPCLR signals are of no concern, and the LOAD signal is a 1 indicating the presence of a message. A message of binary 10 is applied to the CNTRL2 and 1 leads, respectively, for transmission to FIGS. 5 and 7 and, in turn, to the system controller via the scanner. The DIALABDN state is represented by circle 1505 on FIG. 15.

A STABBK (stable break) state follows the DIALABDN state; the input signals to the ROMs are indicated on the left side of FIG. 14 and the output signals generated by the ROMs are indicated on the right side of FIG. 14. This state is represented by circle 1506 on FIG. 15.

Let is be assumed that the presently described call is not abandoned. Thus, the current on-hook state representing the first dial pulse persists for less than 100 milliseconds and is followed by an off-hook state; the on-hook signal therefore represents a valid dial pulse. In this case, the call switches from the COUNTBK state to a STARTMK state as indicated on FIGS. 13 and 15. The state transition occurs when the VAL-NEXT signal switches from a 0 to a 1 while the VAL-LAST signal remains a 0. The STARTMK state is shown on line 6 of FIG. 14 and in circle 1504 of FIG. 15. The time at which this state occurs is shown on FIG. 13 as being within 20 milliseconds of the off-hook transition.

On FIG. 15 and circle 1504, it is shown that the STARTMK state begins when the VAL-NEXT signal again becomes a 1; that the PC counter is now incremented by 1 to indicate that a valid dial pulse has been detected; and that the PT timer is initialized. The reason the timer is initialized is that it must now begin a new 100-millisecond timing interval to determine whether the newly detected off-hook condition represents the termination of dialing or the interval between pulses. The off-hook state between two successive dial pulses must be less than 100 milliseconds in duration.

With reference to line 6 of FIG. 14, the following input signals are now applied to ROMs 610 and 611: VAL-NEXT is a 1, VAL-LAST is a 0, STBL-LAST is a 0 since this is the value of the STBL bit that is recorded in the status word from the COUNTBK status of line 3 of FIG. 14. The values of the PC0 and T0 inputs are of no concern at this time as indicated by the Xs.

ROMs 610 and 611 generate the following output for the STARTMK state: STBL-NEXT is a 0 since the call has changed state within the last 100 milliseconds; INCR for the PT timer is 0 during cycle A, a binary 1 is applied to conductor INCR to increment the PC counter by 1 during cycle B; a binary 1 is applied to conductor TINIT to initialize the PT timer during cycle A; a binary 0 is applied to conductor TPCLR since it is not desired to clear the PC counter at this time; a 0 is applied to the LOAD conductor since no messages are to be generated at this time; the signals applied to control conductors are of no concern.

It is shown on FIG. 14 and circle 1504 on FIG. 15 that the STARTMK status is temporary; that is persists for only one sample at which time the state of VAL-LAST becomes a 1 while VAL-NEXT remains a 1. At that time, the call assumes the COUNTMK state shown as circle 1507. As shown in FIG. 14, ROMs 610 and 611 now receive the following input signals: VAL-NEXT equals 1; VAL-LAST equals 1; STBL-LAST equals 0 from the STBL-NEXT output of the STARTMK state; the PC0 input is of no concern; the T0 input is a 1 since the PT has not timed out.

The ROMs 610 and 611 generate the following output signals for the COUNTMK state; STBL-NEXT is a 0 since the call has changed state within the last 100 milliseconds, INCR is a 1 during cycle A to increment the PT timer, INCR is a 0 during cycle B since the PC counter is not incremented; conductor TINIT receives a 0 so that the PT timer will not be initialized; conductor TPCLR receives a 0 so that the PC counter will not be cleared; a 0 is applied to the LOAD conductor to indicate that no message is present; the signals applied to the two control leads are of no concern at this time.

The call will normally remain in the COUNTMK state for a plurality of successive samples. The only circuit action that occurs on each successive sample is that the PT timer is incremented once on each sample to enable the circuit to time the duration of this state so as to distinguish between an off-hook signal intermediate successive dial pulses and the longer duration off-hook signal that follows the termination of dialing.

Let it be assumed that the calling party at this time is in the process of dialing an initial digit of 2 as shown on FIG. 13. This being the case, the COUNTMK state terminates before 100 milliseconds expire when an on-hook signal is detected representing the beginning of the second pulse of the dialed digit. The first call sample in which this new on-hook signal is validated is termed the STARTBK state as shown on FIG. 13 as well as on circle 1508 of FIG. 15. It is further shown on line 11 of FIG. 14. Circle 1508 indicates that this is an unstable status and that the function of the circuit for this status is to initialize PT counter.

The inputs to ROMs 610 and 611 for this state are: VAL-NEXT is a 0 for the newly detected off-hook condition; VAL-LAST is a 1, STBL-LAST equals 0 from the value of STBL-NEXT from the COUNTMK state of line 8; the value of the PC0 and T0 signals is of no concern at this time.

ROMs 610 and 611 generate the following output signals for the STARTBK status: STBL-NEXT equals 0 indicating that the call has changed state within 100 milliseconds; a 0 is applied to the INCR conductor for both cycles A and B since the PT and PC counters are not incremented; a 1 is applied to conductor TINIT to initialize the PT timer to start a new 100-millisecond timing interval; a 0 is applied to conductor TPCLR so that the PC counter will not be reset; the LOAD signal is a 0 indicating that no message is to be transmitted to system control at this time; and the value of the signals applied to the two control conductors is of no concern.

Circle 1508 of FIG. 15 indicates that the STARTBK state is of the unstable type and that the call advances on the next sample to the COUNTBK state of circle 1503. This state is indicated on line 3 of FIG. 14 and has already been described in connection with the reception of the first dial pulse. The function of the circuit during this state is to begin a timing interval of 100 milliseconds by the PT timer so that the circuit can distinguish between a permanent on-hook state representing a call abandonment and a valid dial pulse which is of less than 100 milliseconds duration.

Let is be assumed that the current on-hook state is followed by an off-hook state within 100 milliseconds as is shown on FIG. 13. This being the case, the termination of the second on-hook signal represents the second dial pulse. The call then enters the STARTMK state shown on FIG. 15 as priorly discussed. This is an unstable state in which the pulse counter is incremented to a count of 2 to indicate that two pulses have now been counted. The PT timer is also initialized.

Next, the call enters the COUNTMK state which has priorly been discussed. The purpose of this state is to enable the system to determine whether the new off-hook state persists for less or longer than 100 milliseconds. A period of less than 100 milliseconds represents a possible third dial pulse; a period of over 100 milliseconds represents the termination of dialing of the first digit. Let it be assumed that the first digit has been dialed and that, therefore, the call remains in the off-hook state for more than 100 milliseconds.

Upon the first sample of the call following the expiration of the 100-millisecond interval as determined by the PT counter, the call enters the DIGDONE state shown on line 9 of FIG. 14. The ROM input signals are now as follows: VAL-NEXT and VAL-LAST are both 1; the STBL-LAST is 0 from the STBL-NEXT output of the COUNTMK state; the PC0 input is a 1 indicating that the PC counter is not set to 0; and the T0 input receives a 0 indicating that the PT timer has timed out. The ROM outputs at this time are: STBL-NEXT equals 1; INCR is a 1 during cycle A to increment the PT timer; INCR during cycle B for the PC counter is of no concern, the TINIT and TPCLR signals are of no concern; the LOAD signal equals a 1; and the two control conductors receive a 00 message that is to be transmitted to the system control. The value of the digit stored in the PC software counter (a 2) is also transmitted to the circuitry of FIGS. 5 and 7 and is included in the message.

The DIGDONE state is indicated by circle 1509 of FIG. 15; it is an unstable state and persists only briefly. The call changes state on the next sample and enters the STABMK state shown in line 1 of FIG. 14 and in circle 1501. This state has been priorly described and it represents a stable condition. It could represent the interval between the dialing of successive digits. It could also represent the talking state of the call if no further dialing is required in connection with the call establishment.

The STABMK state of the call persists until an on-hook condition is again encountered. At that time, the call proceeds through the STATCHO state shown on line 2 of FIG. 14 and circle 1502 of FIG. 15; it further proceeds through the COUNTBK state priorly described. The purpose of the COUNTBK state is to distinguish on-hook intervals of less than 100 milliseconds, such as those representing valid pulses, from on-hook intervals exceeding 100 milliseconds which represent a call abandonment. It is assumed on FIG. 13 that the period now being timed by the PT software timer exceeds 100 milliseconds and therefore the call enters the DIALABDN state shown in line 4 of FIG. 14 and circle 1505 of FIG. 15. This state has already been described and the system function during this state is to transmit a binary 10 message to system control via FIGS. 5 and 7 indicating that the call has been abandoned. The T0 input is a 0 at this time indicating the PT timer has timed out. Subsequently, the call enters the STABBK state representing an idle line.

The currently described call is terminated by now and the associated time slot that served the call is made idle for use in serving other calls. The time division switches 104 and 126 associated with the call are opened or deactivated. The time slot remains in this state indefinitely with the input signals to the ROMs being shown the left side of FIG. 14 for line 5 and with the ROM output signals being shown on the right side of FIG. 14 for line 5.

The initiation of a new call and its assignment to an idle time slot causes the call and the time slot to which it is assigned to enter the STATCH1 state indicated on FIG. 13 as well as on line 7 of FIG. 14 and circle 1510 of FIG. 15. This state is represented by a VAL-NEXT signal of 1, a VAL-LAST signal of 0, and a STBL-LAST of 1 as shown for line 7 on the left side of FIG. 14. The ROM outputs for this state are: STBL-NEXT is a 0 since the call has changed state within 100 milliseconds, the INCR lead is 0 on cycle A and of no concern on cycle B, a 1 is applied to both the TINIT and TPCLR conductors to initialize the PT and PC counters. A 1 is also applied to the LOAD conductor as well as the two control conductors to cause the circuitry of FIGS. 5 and 7 to transmit a binary 11 message to the system controller.

Next, the new call advances through the COUNTMK state shown in circle 1507, and then to the NODIGMK state shown in circle 1511 and line 10 of FIG. 14. The circuit performs no useful function in this state other than to apply a 0 to conductor PC0 indicating that no pulses have been detected. A 0 is on input T0 to indicate that the PT timer has timed out. The call then goes into the STABMK state 1501 and remains there until the first digit is dialed. The new call then advances through the same states already described for the first call.

FIG. 14 discloses the contents of ROMs 610 and 611 as already mentioned. Each ROM is of the 32×8 type which means it has 32 addressable 8-bit wide locations. There are 11 different call states shown on FIG. 14. The signals shown on the left side are the ROM address signals for each state. The 11 different states and 11 different addresses on FIG. 14 actually represent 32 different addresses since each X (a don't care) represents both a 0 and a 1. Thus, each state having one X as an input actually represents two addresses; each state having two Xs represents four different addresses.

The right hand side of FIG. 14 discloses the ROM contents for each address. The same information is stored in two different locations for the call states having one X as an address input signal. It is stored in four different locations for call states having two Xs as address input signals. The column designated "TIMER TO" represents both information stored in ROM 610 for use on cycle A as well as address information applied via path TOUT to ROM 611 for use on cycle B. It is also applied via path TOUT to the input of ROM 610 so that both ROMs may be of the 32×8 type. If desired, the TOUT input could be deleted from ROM 610 and it could then be of the 16×8 type. In any event, it should be appreciated that the timer T0 column represents both the contents of ROM 610 as well as ROM 611 address information on path TOUT.

Figure 5:
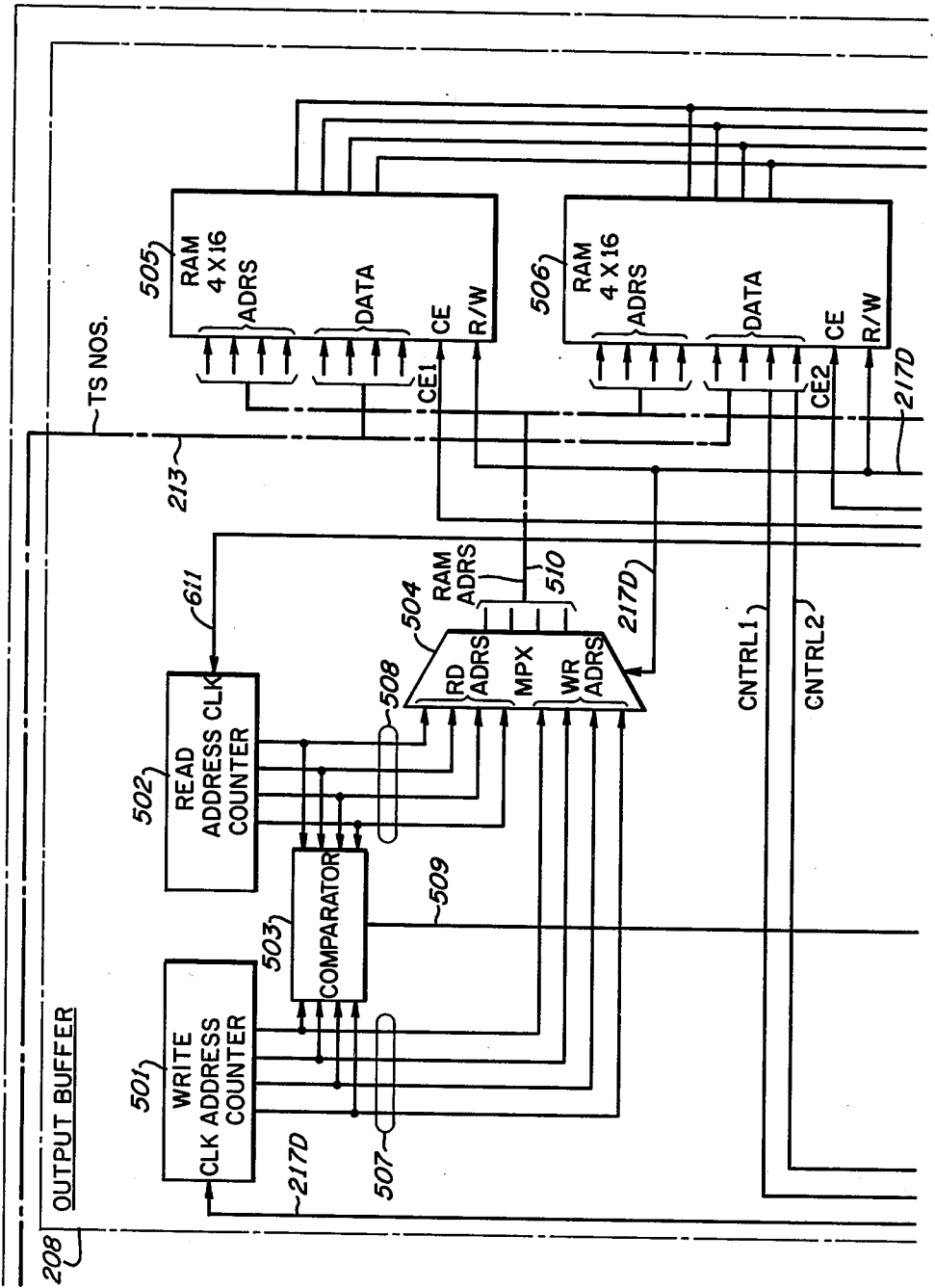
Figure 7:
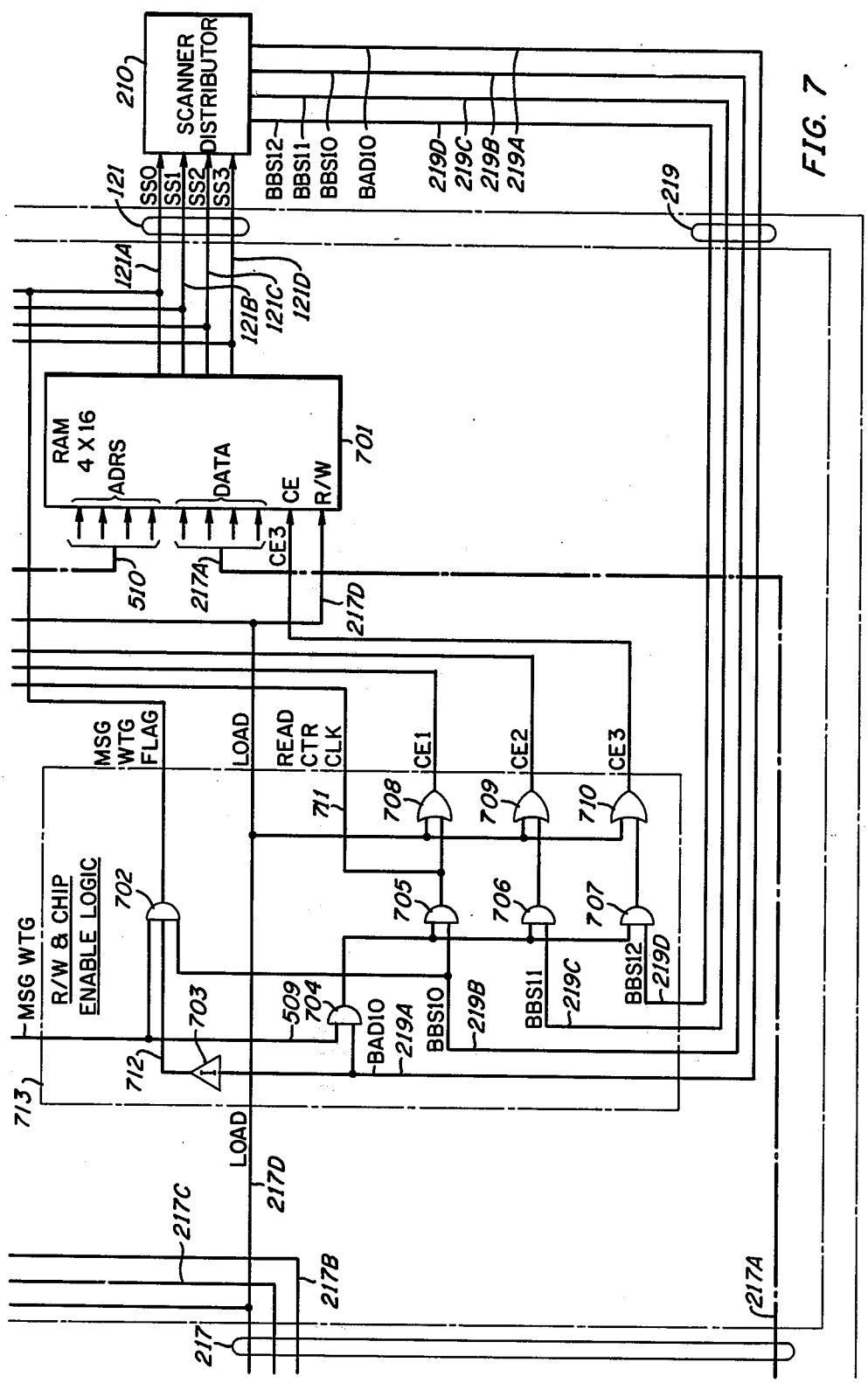

The following describes output buffer 208 shown on FIGS. 5 and 7. The function of this circuit is to receive call state messages from the circuitry of FIG. 6 and to transmit each received message back to the system controller via the scanner distributor 210. LOAD lead 217D is made high by ROMs 610 and 611 when a message is sent to buffer 208. This high extends to the R/W (read/write) input of each of RAMs 505, 506, and 701. This puts the RAMs in a write mode to prepare them for a write operation. This signal also extends via OR gates 708, 709, and 710 to the CE input of each of the RAMs. This signal also extends to the lower input of multiplexor 504 to put it in the mode wherein the input conductors 507 from the write address counter 501 are connected via the multiplexor to its output conductors 510 and, in turn, to the address inputs of the RAMs. This puts the addressing of the RAMs under the control to write address counter 501. Information is now written into the RAMs via their data input. RAM 505 and the top two data inputs of RAM 506 now receive and store the time slot number from path 213 and counter 305. The information written into the currently addressed location in each of the three RAMs forms a 12-bit word having the information format shown in FIG. 9. The address inputs of the three RAMs are connected in parallel so that corresponding RAM locations are used on write and read operations. The lower two data inputs of RAM 506 extend to the CNTRL1 and 2 conductors, 217C and 217B, which receive a two-bit binary code from ROMs 610 and 611 representing each message. The four data inputs of RAM 701 receive the pulse count information from path 217A. The load signal on path 217D terminates upon the transmission of the message to buffer 208 and write address counter 501 is incremented once at its CLK input to set it to the address to be used for writing the next message.

The following describes the scanning operation that takes place when the system control retrieves a message from buffer 208. Scanning is initiated when scanner distributor 210 drives lead 219B high while lead 219A remains low. The low on lead 219A is changed to a high on lead 712 by inverter 703. The high on paths 712 and 219B are applied to the lower two inputs of AND gate 702 to partially enable it. The upper front of this gate is connected to the output of the comparator 503 which determines whether the read and write counters are set to the same address. The two counter outputs are the same when no message is present and, at that time, path 509 is low, AND gate 702 is not enabled and the gate output conductor 121A remains low. This low advises the scanner distributor that there are no messages currently stored in output buffer 208. Conversely, output 509 of comparator 503 is high if the outputs of counters 501 and 502 are different. This high fully enables gate 702 and drives lead 121A high to advise the scanner that one or more messages are currently stored within output buffer 208. Subsequently, the scanner, operating under control of the processor, scans all of the leads 121 to retrieve the message from RAMs 505, 506, and 701. The RAMs are read out one at a time, sequentially to provide a 12-bit message.

The processor initiates a scanning of leads 121 by driving lead 219A high and then, while holding that lead high, by subsequently driving each of leads 219D, C, and B momentarily high in that order. The R/W input of each RAM remains low.

The high provided by the output of the comparator 503 on path 509 extends to the upper input of AND gate 704; the high now on path 219A extends to the lower input of AND gate 704. These two inputs enable the gate and its output partially enables the upper input of each of the AND gates 705, 706, and 707.

Lead 219D is temporarily driven high to read out the contents of the currently addressed location of RAM 701. This potential on path 219D activates AND gate 707 and extends a 1 through OR gate 710 to the CE input of RAM 701. This causes the RAM to read out the contents of the location specified by the information applied to its address input by path 510. The information now read out of the RAM represents the leftmost four bits of the message shown on FIG. 9. These four bits specify the dialed digit in the event that the currently stored message is of the type that represents a dialed digit.

Next, lead 219D goes low and lead 219C goes high. This fully enables AND gate 706 and, by means of OR gate 709, applies a high to the CE input of RAM 506 to read it out. As shown on FIG. 9, the four bits now read out of this RAM represent bits CNTRL1 and 2 as well as the leftmost two bits of the system time slot serving the call.

Next, lead 219C goes low and lead 219B goes high to enable AND gate 705. The high on the output of this gate is extended through OR gate 708 to CE input of RAM 505 to read out the four bits of its currently addressed location. As shown in FIG. 9, these four bits represent the rightmost four bits of the time slot number. The output of AND gate 705 is connected via path 711 to the CLK input of the read address counter 502. The driving of lead 711 high to read out RAM 505 followed by the return of this lead to a low state increments the counter 502 by one.

Lead 217D is connected to the lower input of the multiplexor 504. This lead is low during a read operation and at that time the multiplexor connects the output of counter 502 on path 508 to the multiplexor output of path 510 and, in turn, to the address inputs of the three RAMs. This places the addressing of the RAMs during the readout operation under control of counter 502.

Upon the completion of the readout of RAM 505, the processor next attempts to read out another message. The readout of an all 0s word represents no message and terminates the scanning operation. Assuming that the prior message read out was not all 0s, the processor again momentarily drives leads 219D, C, and D high in that order while holding lead 219A high. This sequence may continue as long as there are additional messages stored in the buffer 208. The output of comparator 503 is a 0 for a match state between counters 501 and 502. A match indicates that no messages are currently stored in the buffer. At that time, the upper input of AND gates 702 and 704 are inhibited and the high on lead 219A cannot extend through AND gate 704 to partially enable AND gates 705, 706, and 707. Thus, the CE inputs of the three RAMs are not driven high when leads 219D, C, and B are subsequently momentarily driven high in that order. This supplies an all 0 message to the RAM output leads 121 to signify a no message condition to the processor and thereby terminates the message scanning operation.

In summary, the use of the disclosed circuitry provides system control with certain call state information such as the identification of dialed digits, switchhook flash, call initiations, call abandonment, etc. It does this in a manner that minimizes real time requirements of system control so as to enable it to perform other useful work.

We claim:

1. In a time division switching system in which communication signals are transmitted over a first time division bus system between port circuits connected on a call under control of a system controller, each call served by said system being assigned to a unique time slot in a series of cyclically recurring time slots, said switching system further comprising the combination of:
 a second time division bus system connected to said port circuits,
 means effective during each occurrence of a time slot to which a call currently being served by one of said port circuits is assigned for applying hook state information signals from said one port circuit to said second bus system,
 means responsive to the application of said hook state signals to said second bus system for generating output messages specifying call state information for the calls to which said hook state signals pertain, each message being unique to a single call,
 and means for transmitting each generated message to said system controller to control the serving of calls by said system, each of said messages including information specifying the identity of the time slot to which the call represented by each message is assigned.

2. The combination of claim 1 in which a message specifying a call state representing the completion of the reception of a pulse train representing a dialed digit further contains information identifying said dialed digit.

3. The combination of claim 1 wherein said call state information represented by said messages alternatively includes:
 information specifying the off-hook state of a call prior to the initiation of dialing,
 information specifying the receipt of a first dial pulse,
 information identifying a dialed digit following the receipt of a pulse train representing said digit, or
 information specifying an on-hook state representing a call termination.

4. In a time division switching system in which communication signals are transmitted between port circuits connected on a call over a first time division bus system under control of a system controller, each call served by said system being assigned to a unique time slot in a series of cyclically recurring time slots, said switching system further comprising the combination of,
 a second time division bus system connected to said port circuits,
 means effective during each occurrence of each time slot to which a call currently being served by one of said port circuits is assigned for applying hook state information signals to said second bus system from said one port circuit,
 logic means responsive to the application of said hook state signals to said second bus system for concurrently deriving call state information for all calls currently served by active ones of said port circuits,
 means responsive to said deriving for detecting the occurrence of different call states for calls served by said active port circuits,
 means for generating an output message upon each detection of the occurrence of predetermined ones of said call states,
 and means for transmitting each message to said system controller, each of said messages containing information specifying one of said predetermined call states as well as the identity of the time slot to which the call represented by each message is assigned.

5. The combination of claim 4 in which each message specifying a call state representing the completion of the reception of a pulse train representing a dialed digit further contains information identifying the dialed digit.

6. The combination of claim 4 wherein said call state information represented by said messages alternatively includes:
 information specifying the off-hook state of a call prior to the initiation of dialing,
 information specifying the receipt of a first dial pulse,
 information identifying a dialed digit following the receipt of a pulse train representing said digit, or
 information specifying an on-hook state representing a call termination.

7. The combination of claim 4 in which said logic means comprises:
 sample and hold means,
 means effective during each nth occurrence of a time slot assigned to an active port circuit for extending the current hook state signal of said active port circuit from said second bus system into said sample and hold means to form a sample signal,
 means responsive to the entry of said hook state signal into said sample and hold means for comparing said sample signal with information priorly derived for the call to which said sample signal pertains, means responsive to said comparison for updating the state of said last named call, and means responsive to said updating for controlling the detection of the occurrence of said predetermined call states.

8. The combination of claim 4 in which said port circuits include line port circuits and trunk port circuits and in which said second bus system comprises a line bus connected to said line port circuits and a trunk bus connected to said trunk port circuits, said system and said logic means further comprising:

sample and hold means, means for applying hook state signals from said line bus to said sample and hold means during each occurrence of a time slot to which a call served by a line port circuit is assigned, switching means for applying hook state signals from said trunk bus to said sample and hold means only during the occurrence of a time slot to which is assigned a call in a call state in which dial pulses may be received by a trunk port circuit, and means for entering an applied hook state signal as a sample signal into said sample and hold means every nth occurrence of the system time slot to which is assigned the call to which said applied hook state signal pertains.

9. The combination of claim 5 wherein said switching means comprises:

a storage means having a storage position unique to each time slot in said series, means for writing an enable signal in a storage position of said storage means when the time slot associated with said position currently has assigned to it a call for which one of said trunk port circuits may receive dial pulses, means for reading out any enable signals stored in said storage means sequentially position by position under control of signals representing each occurrence of each of said time slots whereby each stored enable signal is read out concurrently with the occurrence of its associated time slot, means responsive to the reading out of each enable signal to close said switching means during the occurrence of the readout, and means responsive to the closure of said switching means for applying the hook state signal on said trunk bus to said sample and hold means.

10. The combination of claim 9 in which said logic means and said means for detecting comprise:

a first memory for storing a status word unique to each call currently served by said system, means responsive to the entry of a hook state signal into said simple and hold means for reading out from said first memory the call status word for the call whose hook state is currently stored in said sample and hold means, a second memory, means for applying said read out status word to said second memory, means for applying said sample signal to said second memory, means including said second memory responsive to the reception of said status word and said sample signal for deriving an update status word for said call, and means for writing said updated status word into said first memory in place of said read out status word.

11. In a time division switching system in which communication signals are transmitted between port circuits connected on a call over a first time division bus system under control of a system controller, each call served by said system being assigned to a unique time slot in a series of cyclically recurring time slots, said port circuits comprising line port circuits and trunk port circuits, said switching system further comprising the combination of;

a line bus connected to said line port circuits and a trunk bus connected to said trunk port circuits, means effective during each occurrence of each time slot to which a call currently being served by one of said line port circuits is assigned for applying hook state signals to said line bus from said one line port circuit, means effective during each occurrence of each time slot to which a call currently being served by one of said trunk port circuits is assigned for applying hook state signals to said trunk bus from said one trunk port circuit, a sample and hold circuit, means for applying hook state signals from said line bus to said sample and hold circuit during each occurrence of a time slot to which a call currently served by a line port circuit is assigned, switching means for applying hook state signals from said trunk bus to said sample and hold circuit only during the occurrence of a time slot to which is assigned a call in a dial pulse receiving state in which dial pulses may be received by a trunk port circuit currently serving said call, means for entering an applied hook state signal into said sample and hold circuit only every nth occurrence of the time slot to which is assigned the call to which said applied hook state signal pertains, said entered signal defining a sample signal, logic means responsive to the entry of said hook state signal to said sample and hold circuit for deriving call state information for calls currently served by said line port circuits and by said trunk port circuits in a dial pulse receiving state, means for detecting the occurrence of a plurality of different call states for the calls served by said last named line and trunk port circuits, means for generating an output message upon each detection of the occurrence of predetermined ones of said call states, and means for transmitting each message to said system controller to control the serving of calls by said system.

12. The combination of claim 11 in which each of said messages includes information specifying one of said call states as well as the identity of the time slot to which the call represented by each message is assigned.

13. The system of claim 12 in which each message specifying a call state representing the completion of the reception of a pulse train representing a dialed digit also contains information identifying the dialed digit.

14. The combination of claim 13 wherein said switching means comprises;

a shift register having a bit position unique to each time slot in said series, means for writing an enable signal in a bit position when the time slot associated with said position has assigned to it a call for which a trunk port circuit serving said call is in a dial pulse receiving state, means for reading out the enable signals stored in said register sequentially position by position under control of signals representing each occurrence of said time slots whereby each enable signal is read out concurrently with the occurrence of its associated time slot, means responsive to the reading out of each enable signal to close said switching means during the occurrence of the readout, and means responsive to said closure for entering the hook state signal currently on said trunk bus into said sample and hold means.

15. The combination of claim 14 in which said logic means comprises:

means responsive to the entry of said hook state signal into said sample and hold circuit for comparing said sample signal with information priorly derived for said call to which said sample signal pertains, means responsive to said comparison for updating the state of said last named call, and means responsive to said updating for controlling the detection of the occurrence of said predetermined call states.

16. The combination of claim 15 in which said comparing means comprises:

a first memory for storing a status word unique to each call currently served by said system, means effective upon a comparison operation for reading out from said first memory the call status word for the call whose hook state is currently stored as a sample signal in said sample and hold means, a second memory, means for applying said read out status word to said second memory, means for applying said sample signal to said second memory, means including said second memory responsive to the reception of said status word and said sample signal for deriving an updated status word for said call, and means for writing said updated status word into said first memory.

17. The combination of claim 16 in combination with;

a counter having a plurality of bit positions and a plurality of output conductors each of which is unique to a different one of said positions, means for operating said counter in response to the receipt of signals representing system time slots whereby the signals on said output conductors together identify the system time slot whose hook state signal can then be entered into said sample and hold circuit, and means for reading and writing said first memory under control of address information including said time slot number information from said counter output conductors.

18. The method of deriving call state information in a time division switching system having a plurality of port circuits in which each call currently served by said system is assigned to a unique time slot in a series of cyclically recurring time slots, said method comprising the steps of:

(1) connecting said system port circuits serving the same call to each other over a first bus system for the exchange of communication signals during each occurrence of the time slot to which said call is assigned, (2) applying hook state signals from a port circuit serving a call to a second bus system during each occurrence of the time slot to which the call served by said port circuit is assigned, (3) extending hook state signals representing active ones of said port circuits from said second bus system to logic means, (4) deriving call state information specifying the current call status for each call served by an active one of said port circuits, (5) detecting the occurrence of certain predetermined call states, (6) generating an output message upon each occurrence of one of said predetermined states, and (7) transmitting each message to a system controller for controlling the serving by said system of the call to which each message pertains, each message containing information specifying the identity of the time slot serving the call to which said message pertains as well as information specifying the detected predetermined call state.

19. The method of claim 18 wherein a message contains information specifying the identity of a dialed digit whenever the message is associated with a call state specifying the completion of the reception of a pulse train representing said dialed digit.

20. The method of claim 21 in which said steps of extending and deriving include the steps of:

(1) sampling the hook state signals on said second bus system for a call served by an active port circuit every nth occurrence of the time slot to which said call is assigned, (2) holding said sampled signal for a time duration comprising a maximum of n time slots, (3) comparing said sampled signal with information priorly derived for said call or prior samples of the same time slot, and (4) updating said call state information upon said comparison.

21. The method of claim 20 wherein said port circuits include line port circuits and trunk port circuits and in which said second bus system comprises a line bus connected to said line port circuits and a trunk bus connected to said trunk port circuits, said method comprising the steps of:

(1) connecting said line bus signalwise to an input of a sampling means whereby hook state signals from said line bus are applied to said sampling means during each occurrence of a time slot currently assigned to a call served by a line port circuit, (2) connecting said trunk bus signalwise to said sampling means whereby hook state signals from said trunk bus are applied to said sampling means only during the occurrence of a time slot to which is assigned a call currently in a state in which dial pulses may be received by a trunk port circuit, and (3) entering an applied signal into said sampling means only during every nth occurrence of the time slot to which is assigned the call to which said signal pertains.

22. The method of claim 21 wherein said signalwise connection of said trunk bus to said sampling means is controlled by a switching means and a storage means having a storage position unique to each system time slot in said series, and wherein said method comprises the steps of:

(1) writing a predetermined signal in a storage position only when the time slot associated with said position is serving a call currently in a state for which one of said trunk port circuits serving said call may receive dial pulses, (2) reading out the signals stored in said storage means sequentially position by position whereby the signal in each position is read out concurrently with its associated time slot, (3) closing said switching means upon the readout of each signal during the occurrence of the associated time slot, and (4) applying the hook state signal currently on said second bus system to said sampling means upon the closure of said switching means.

23. The method of claim 22 in which said system includes a first memory for storing a status word unique to each call currently served by said system and further includes a second memory, and wherein said step of comparing includes the steps of:

(1) reading out from said first memory the call status word for the call whose hook state signal is currently stored in said sampling means, (2) applying said read out status word to said second memory, (3) applying said hook state signal from said sampling means to said second memory, (4) deriving an updated status word for said call upon the reception of said status word and said hook state signal, and (5) writing said updated status word into said first memory in place of said read out status word.

* * * * *